(12) United States Patent
Kasami et al.

(10) Patent No.: US 7,583,652 B2
(45) Date of Patent: *Sep. 1, 2009

(54) WIRELESS COMMUNICATION APPARATUS

(75) Inventors: Hideo Kasami, Kawasaki (JP); Kuniaki Ito, Kawasaki (JP); Kiyoshi Toshimitsu, Yokohama (JP); Tomoko Adachi, Urayasu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/613,900

(22) Filed: Dec. 20, 2006

(65) Prior Publication Data

US 2007/0104171 A1 May 10, 2007

Related U.S. Application Data

(62) Division of application No. 10/156,111, filed on May 29, 2002, now Pat. No. 7,158,501.

(30) Foreign Application Priority Data

May 29, 2001 (JP) .............................. 2001-160928

(51) Int. Cl.
*H04B 7/212* (2006.01)
(52) U.S. Cl. ....................................... 370/347; 370/334
(58) Field of Classification Search ....................... None
See application file for complete search history.

(56) References Cited

U.S. PATENT DOCUMENTS

| 5,828,658 | A | 10/1998 | Ottersten et al. |
| 5,864,543 | A | 1/1999 | Hoole |
| 6,141,567 | A | 10/2000 | Youssefmir et al. |
| 6,177,906 | B1 | 1/2001 | Petrus |
| 6,240,094 | B1 * | 5/2001 | Schneider ................ 370/412 |
| 6,330,460 | B1 * | 12/2001 | Wong et al. .............. 455/562.1 |
| 6,346,910 | B1 * | 2/2002 | Ito ........................... 342/174 |
| 6,347,220 | B1 * | 2/2002 | Tanaka et al. ............ 455/277.2 |
| 6,603,744 | B2 | 8/2003 | Mizutani et al. |
| 6,690,952 | B2 | 2/2004 | Nishimori et al. |
| 6,771,988 | B2 | 8/2004 | Matsuoka et al. |
| 6,839,573 | B1 | 1/2005 | Youssefmir et al. |
| 6,901,062 | B2 * | 5/2005 | Scherzer et al. ............ 370/335 |
| 7,039,356 | B2 * | 5/2006 | Nguyen .................... 455/13.3 |

(Continued)

OTHER PUBLICATIONS

C. Sakr, et al., Network Protocols, 1997. Proceedings, pp. 45-52, XP-010258685, "Carrier-Sense Protocols For Packet-Switched Smart Antenna Basestations", Oct. 28, 1997.

(Continued)

*Primary Examiner*—Phirin Sam
(74) *Attorney, Agent, or Firm*—Oblon, Spivak, McClelland, Maier & Neustadt, P.C.

(57) ABSTRACT

The wireless communication apparatus includes transmitter modules and receiver modules for carrying out transmission/reception via a plurality of antenna beams formed by an adaptive array antenna between stations. The apparatus is provided with an end time detecting section and a maximum reception end time is detected by detecting section based on reception signals on the receiver modules. A reception end signal is generated from a notifying section, when current time counted by a counter is reached to the maximum reception end time. The transmission enabling section causes the transmitter modules to transmit data in response to the reception end signal.

15 Claims, 26 Drawing Sheets

U.S. PATENT DOCUMENTS

| | | | |
|---|---|---|---|
| 7,039,445 B1 * | 5/2006 | Yoshizawa | 455/575.7 |
| 7,158,501 B2 * | 1/2007 | Kasami et al. | 370/339 |
| 7,170,873 B1 * | 1/2007 | Cisar et al. | 370/334 |
| 7,174,178 B2 * | 2/2007 | Bergel | 455/502 |
| 2002/0013164 A1 | 1/2002 | Leifer et al. | |
| 2003/0181221 A1 * | 9/2003 | Nguyen | 455/562.1 |
| 2003/0231700 A1 * | 12/2003 | Alamouti et al. | 375/144 |
| 2004/0037263 A1 * | 2/2004 | Zeira | 370/347 |
| 2005/0002373 A1 * | 1/2005 | Watanabe et al. | 370/346 |
| 2007/0026805 A1 * | 2/2007 | Ishida | 455/63.1 |

OTHER PUBLICATIONS

Y.-B. Ko, et al., Infocom 2000, Ninteenth Annual Joint Conference of the IEEE Computer and Communications Societies. Proceedings, pp. 13-21. XP-010376001, "Medium Access Control Protocols Using Directional Atennas in Ad Hoc Networks", Mar. 26, 2000.

* cited by examiner

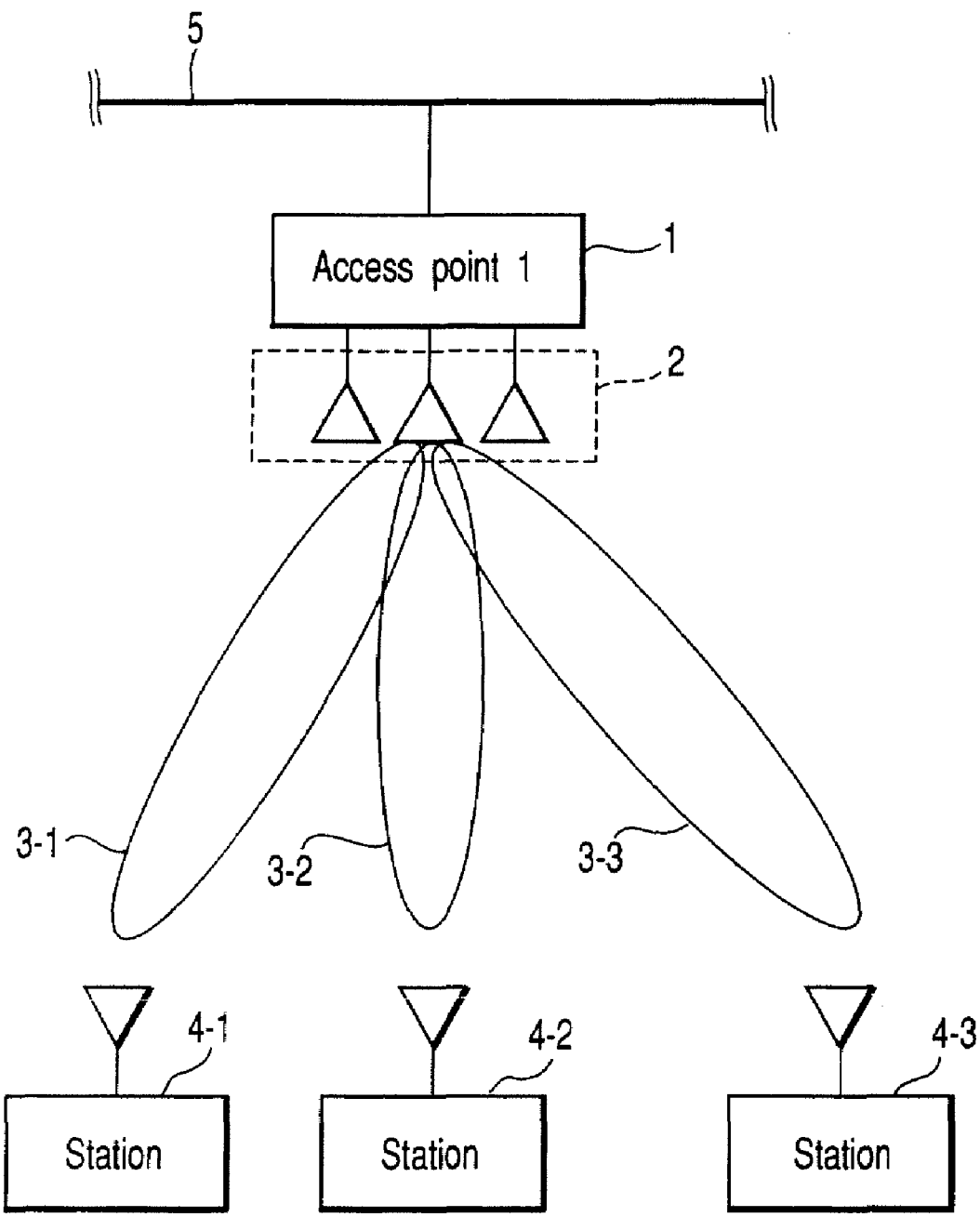
F I G. 1

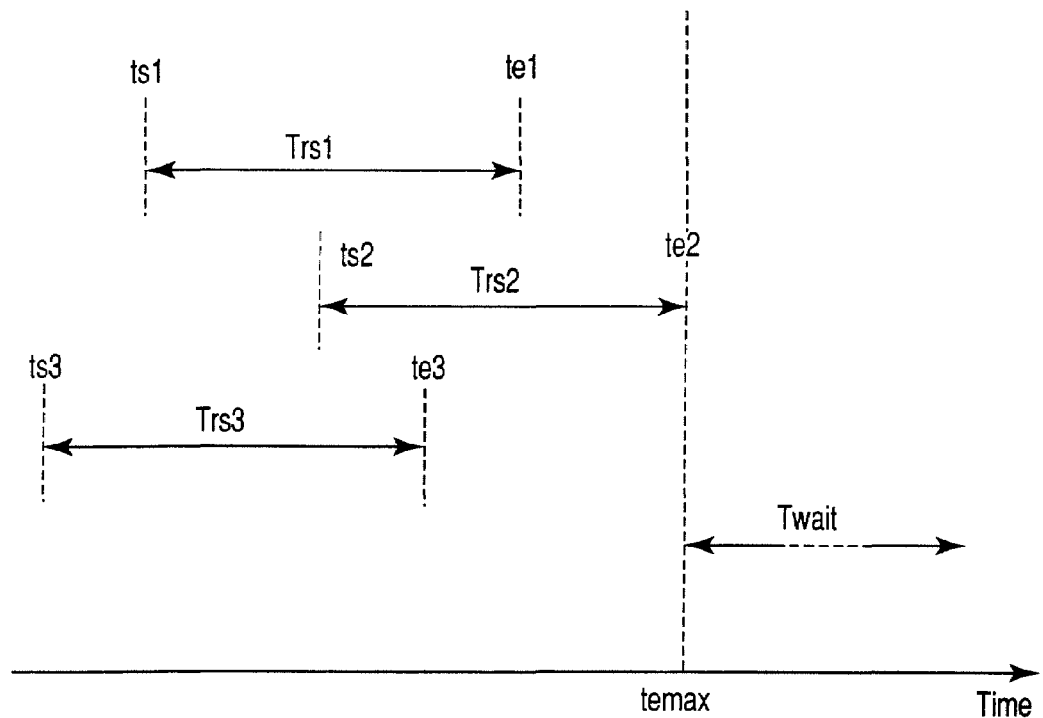
FIG. 10
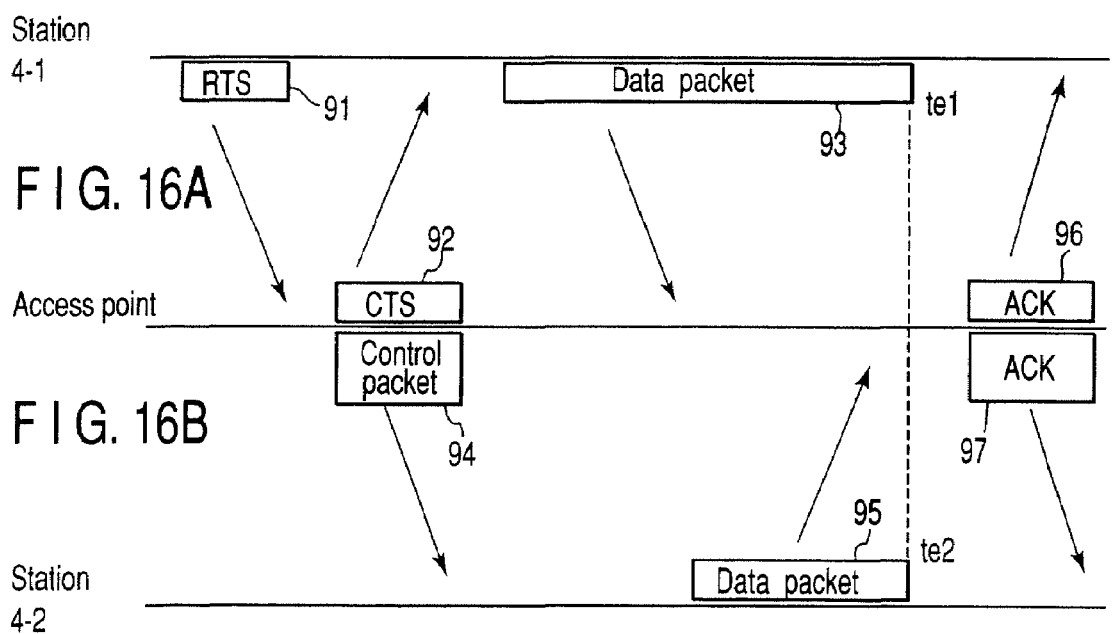
FIG. 16A
FIG. 16B
FIG. 16C

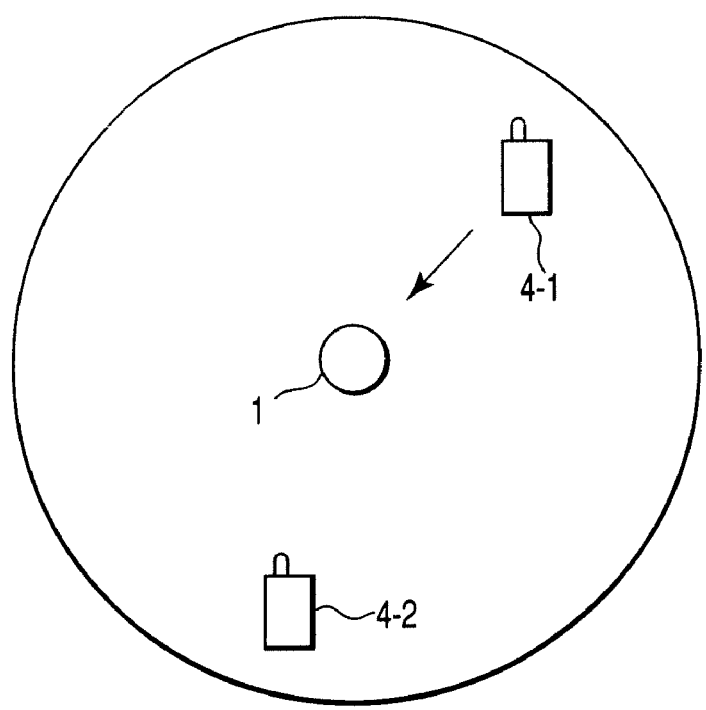
F I G. 15A
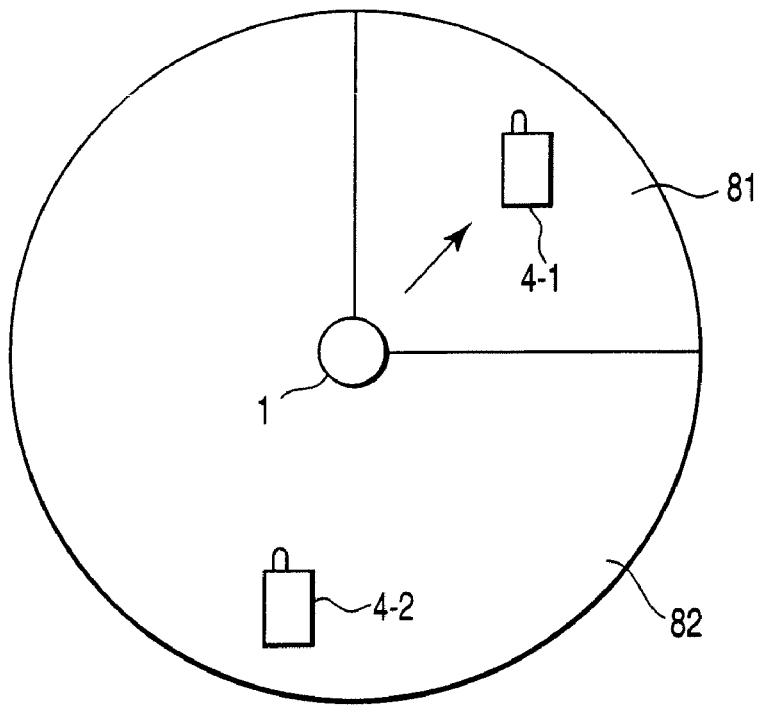
F I G. 15B

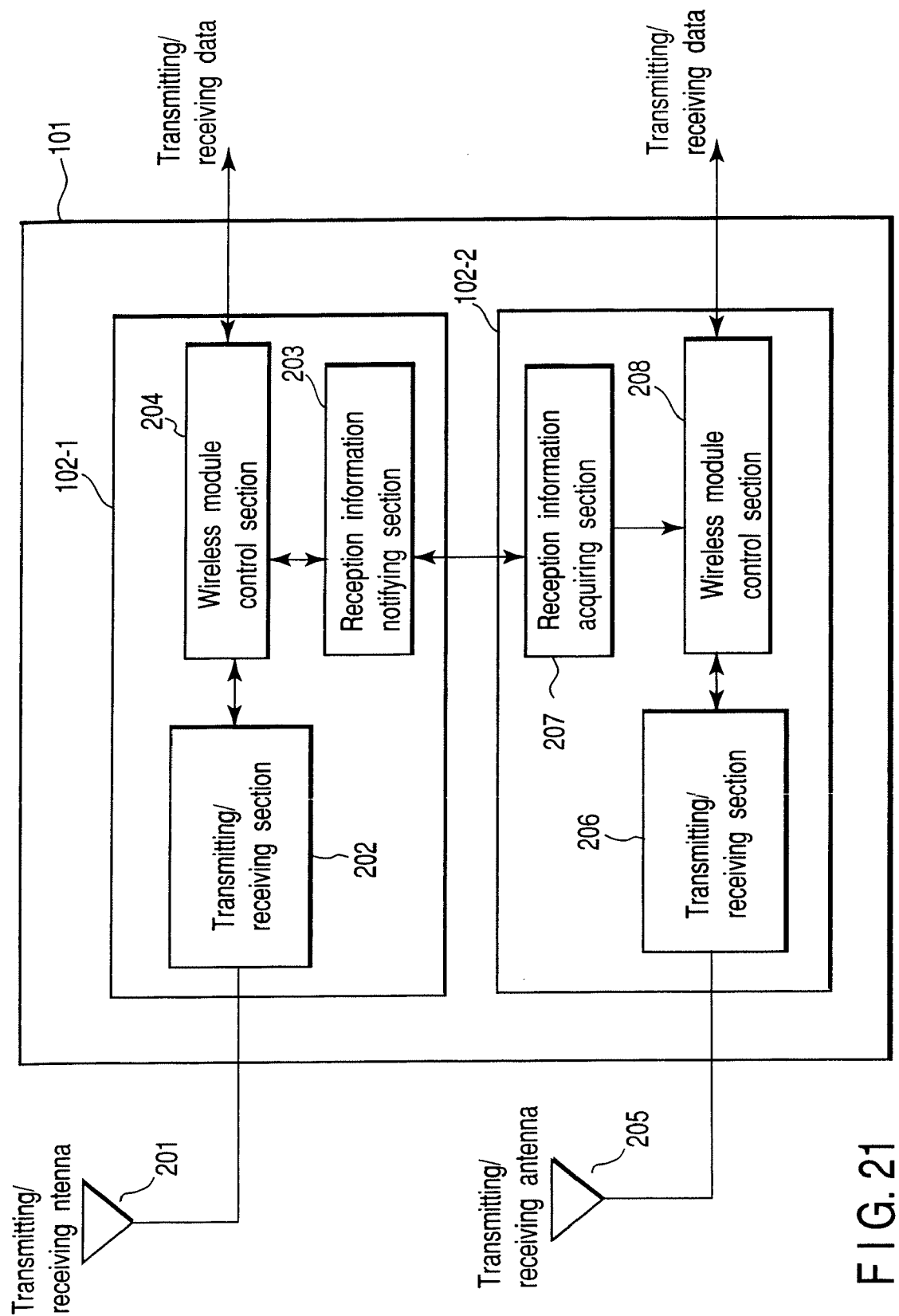
F I G. 21

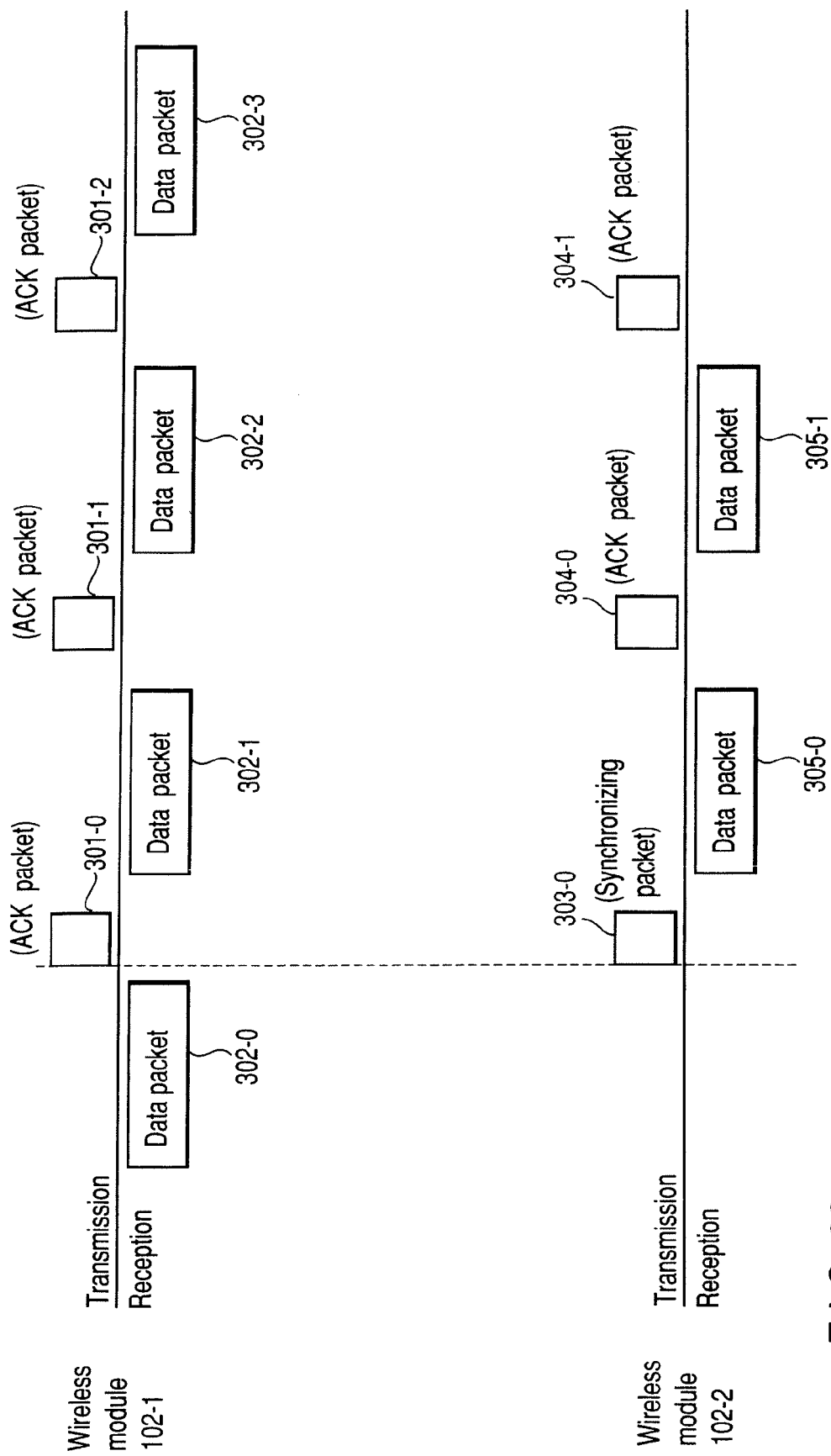
F I G. 22

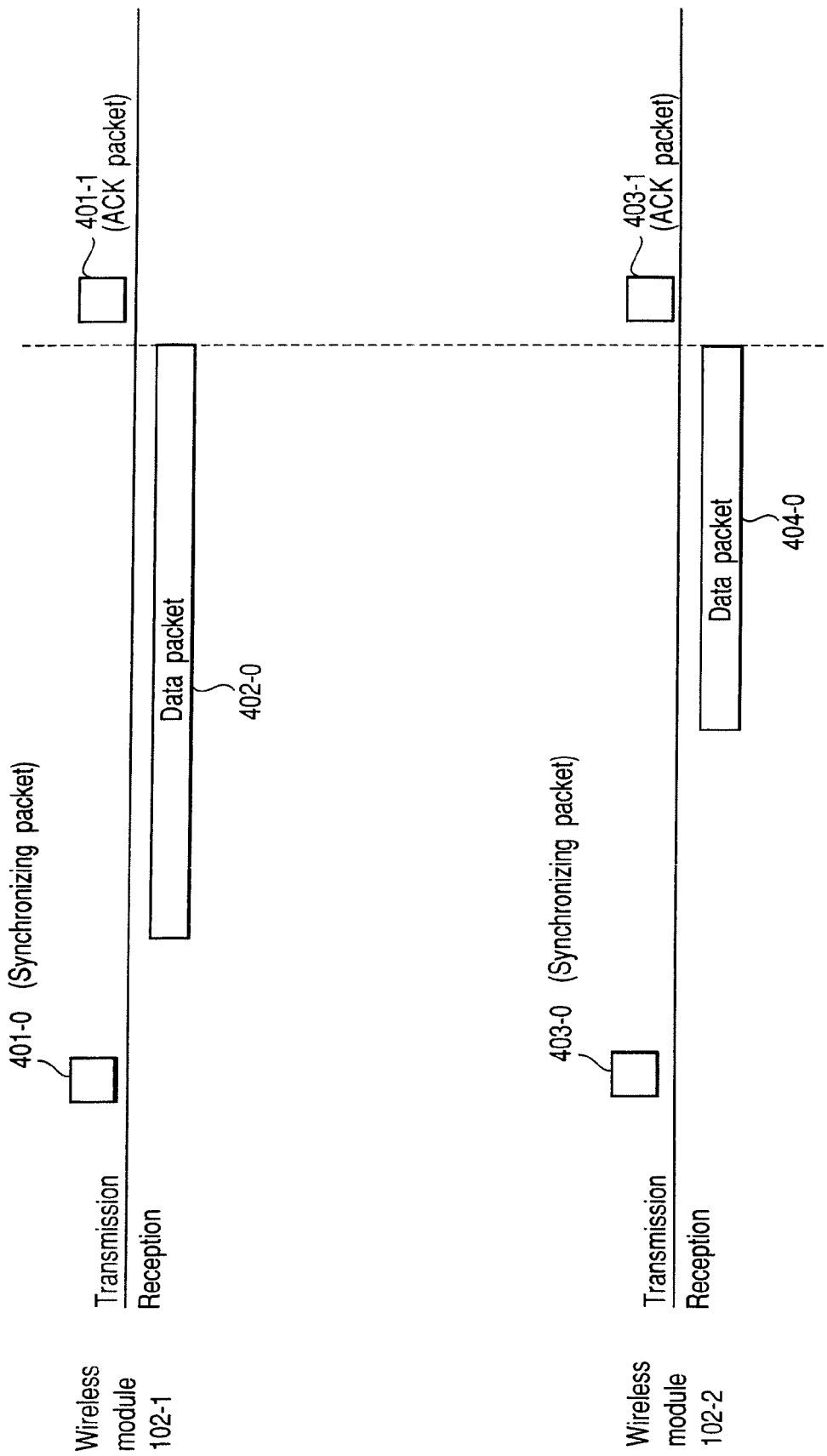
F I G. 23

WIRELESS COMMUNICATION APPARATUS

CROSS-REFERENCE TO RELATED APPLICATIONS

This application is a divisional of and claims the benefit of priority under 35 USC §120 from U.S. Ser. No. 10/156,111, filed May 29, 2002 now U.S. Pat. No. 7,158,501 and is based upon and claims the benefit of priority under 35 USC §119 from the Japanese Patent Applications No. 2001-160928, filed May 29, 2001, the entire contents of which are incorporated herein by reference.

BACKGROUND OF THE INVENTION

1. Field of the Invention

The present invention relates to a wireless communication station and, more particularly, to an access point which communicates with wireless communication stations via a plurality of channels.

2. Description of the Related Art

There is known a wireless LAN system making communication between an access point (AP) and a plurality of wireless communication stations (STAs). As this wireless LAN system, there is provided a wireless LAN system (ISO/IEC 8802-11:1999(E) ANSI/IEEE std 802.11, 1999 edition) under the IEEE802.11 standard that defines a CSMA (Carrier Sense Multiple Access). In this wireless LAN system, in general, prior to transmitting a packet to a wireless station, which is so called a target station to which the packet is to be transmitted, an access point senses a carrier for transmitting the packet. However, where a reception state in which a packet including channel reservation information is received from another station is established, packet transmission to the target station is suspended. Where the transmission is suspended, the access point starts transmission of a packet for specifying an address for the target station after ending of the packet reception state for the another station and elapse of a random transmission waiting period computed at a control section of the access point. In this way, processing in which the transmission to the station is suspended, the random transmission waiting period is elapsed, and the packet is transmitted is referred to as back-off processing.

The target station transmits an acknowledge response (ACK) packet to the access point after a predetermined period if data on the received packet has been normal. At the access point, when the ACK packet from the target station cannot be received after the elapse of the predetermined period, the control section executes back-off processing, and a packet is transmitted again.

On the other hand, a Space Division Multiple Access (SDMA) method is known as one of the multiplexing schemes in a wireless communication system. In the SDMA method, a plurality of antenna beams for spatially decreasing mutual interference are generated from an adaptive array antenna provided at the access point. Therefore, the SDMA method can improve its communication quality and can achieve simultaneous communication between the access point and a plurality of stations. The SDMA method is applied to a wireless LAN system of the CSMA method, whereby it is expected that an advantage of the SDMA method can be provided.

However, if the SDMA method is simply applied to the wireless LAN system of the CSMA method, the following problem occurs.

In the SDMA method, at the access point, there is provided transmitter and receiver modules corresponding to a plurality of antenna beams formed by an adaptive array antenna. Further, individual control sections control the transmitter and receiver modules, respectively. In an ideal communication system provided with the adaptive array antenna, each of the antenna beams can be used for receiving only one signal from the target station without being affected from another stations. Thus, if the CSMA is executed for each antenna beam by these individual control sections, back-off processing is executed for each antenna beam. As a result, there can occur a case in which, at the access point, both of transmission to one station and reception from another station takes place at the same time. That is, even if the access point attempts to receive a packet from one station (TE1), when transmission to another station (TE2, TE3) takes place at the same time as the reception, such transmission may act as an interference and affect on the reception from the station TE1, thus disabling reception.

Where the access point transmits packets to the plurality of stations (TE1, TE2, TE3), no reception state occurs at the access point. Thus, a collision between transmission and reception can be basically prevented. However, when one side of packet to be transmitted to one station TE1 is smaller than that of packet to be transmitted to another station TE2, TE3, even if the access point is placed in a transmitting state for transmitting the packets to the stations TE2, TE3, respectively, the station TE1 generally terminates packet reception. Therefore, this station TE1 transmits an ACK packet to the access point. As a result, even if the access point could receive the ACK packet from the station TE1, the access point may not actually receive the ACK packet from the station TE1 due to an interference caused by the packet transmission from the access point to the stations TE2, TE3. This ACK packet has an effect on transmission to the station TE2, TE3, and the station TE2, TE3 cannot receive a packet from the access point.

Further, at the access point, where an ACK packet is not received from one of a plurality of stations TE1, TE2 and TE3, for example, one station TE2, there is a problem that back-off processing is executed at the access point for transmission and reception between the access point and the station TE2, and a timing of transmitting a packet to each of the stations TE1, TE2 and TE3 during this processing and subsequent is shifted.

The similar problem will occur in the CSMA/CA (Carrier Sense Multiple Access with Collision Avoidance) method in which communication is autonomously controlled by using a protocol as well as a case of simply applying the SDMA (Space Division Multiple Access) method to the wireless LAN system of the CSMA (Carrier Sense Multiple Access) method. That is, in the wireless access point in which the CSMA/CA method has been employed, where a channel to be used has been an adjacent channel or the same channel, there is a problem that signals of the respective channels interfere with each other, and a data transmission error occurs.

BRIEF SUMMARY OF THE INVENTION

It is an object of the present invention to provide a wireless communication station capable of properly carrying out transmission/reception between the wireless communication station and another wireless communication station.

According to an aspect of the present invention, there is provided a wireless communication apparatus for receiving first and second reception signals from another wireless communication stations and transmitting first transmission signal to another wireless communication station, comprising:

a receiving section including first and second receiver modules configured to sense first and second reception signals to be set in a reception mode, and receive the first and second reception signals from the another wireless communication stations in a reception mode;

a responding section configured to respond to an end timing of receiving the first and second reception signals in the receiving section to generate a reception end signal;

a transmission section including first transmitter modules configured to transmit the first transmission signal in a transmission mode and inhibit the transmission of the first transmission signal in the reception mode, the transmission section being kept in a waiting state in the transmission mode to wait the occurrence of the first transmission signal; and an enabling section configured to enable the transmission section to transmit the first transmission data signal, the enabling section causing the transmission section to switch into the transmission mode from the reception mode in response to the reception end signal and to keep the transmission section in the waiting state, the transmission of first transmission signal being started in the waiting state.

According to an another aspect of the present invention, there is provided a wireless communication apparatus for executing collision access control in accordance with Carrier Sense Multiple Access Collision Avoidance protocol, to transmit and receive data packets using first and second radio channels between the wireless communication apparatus and the first and second station units, the wireless communication apparatus comprising:

a first wireless communication module section configured to transmit and receive the data packet in the first radio channel in first transmission and reception modes, respectively;

a second communication wireless module section configured to transmit and receive the data packet in the second radio channel in the second transmission and reception modes, respectively; and a control section configured to control the second wireless communication module to prevent the second wireless communication module from transmitting the data packet in response to a detection of the first reception mode while the first wireless module is receiving a data packet in the first reception mode.

According to a still another aspect of the present invention, there is provided a wireless communication apparatus for executing collision access control in accordance with Carrier Sense Multiple Access Collision Avoidance protocol, to transmit and receive data packets using first and second radio channels between the wireless communication apparatus and the first and second station units, the wireless communication apparatus comprising:

a first wireless communication module section configured to transmit and receive the data packet in the first radio channel in first transmission and reception modes, respectively;

a second communication wireless module section configured to transmit and receive the data packet in the second radio channel in the second transmission and reception modes, respectively; and a control section configured to control the second wireless communication module to transmit a dummy packet and prevent the second wireless communication module from receiving the data packet in response to a detection of the first transmission mode while the first wireless module is transmitting a data packet in the first transmission mode.

According to a still another aspect of the present invention, there is provided a wireless communication apparatus for executing collision access control in accordance with Carrier Sense Multiple Access Collision Avoidance protocol, to transmit and receive data packets using first and second radio channels between the wireless communication apparatus and the first and second station units, the wireless communication apparatus comprising:

a first wireless communication module section configured to transmit and receive the data packet in the first radio channel in first transmission and reception modes, respectively;

a second communication wireless module section configured to transmit and receive the data packet in the second radio channel in the second transmission and reception modes, respectively; and a control section configured to control the first and second wireless communication modules to sense the first and second radio channels and set the first and second wireless communication modules in a synchronous mode in which the data packets start to be transmitted from the first and second wireless communication modules at a same time.

BRIEF DESCRIPTION OF THE SEVERAL VIEWS OF THE DRAWING

FIG. 1 is a block diagram schematically showing a wireless LAN system according to a first embodiment of the present invention;

FIG. 10 is a timing chart illustrating an operation of the maximum reception end time detecting section shown in FIG. 8;

FIG. 15A is a block diagram showing disposition of an access point and a station according to another embodiment of the present invention;

FIG. 15B is a view showing a pattern of antenna beams formed in a direction of each station by the access point at a down-link in the system shown in FIG. 15A;

FIG. 16A to 16C are time charts illustrating an operation in the system shown in FIG. 15A;

FIG. 21 is a block diagram showing a circuit configuration of a wireless access point shown in FIG. 21;

FIG. 22 is a schematic view showing operation of receiving and transmitting procedures in the wireless module shown in FIG. 21;

FIG. 23 is a schematic view showing another operation of receiving and transmitting procedures in the wireless module shown in FIG. 21;

DETAILED DESCRIPTION OF THE INVENTION

Hereinafter, preferred embodiments of the present invention will be described with reference to the accompanying drawings.

FIG. 1 shows a wireless LAN system in which a space division multiplexing access (SDMA) method is applied as a wireless communication system according to a first embodiment of the present invention. This wireless LAN system is constructed in conformance with the IEEE802.11 standard (including IEEE802.11a, IEEE802.11b). An access point 1 is installed in its specific fixed location, and is connected to a backbone network 5. The access point 1 comprises an adaptive array antenna 2. The adaptive array antenna 2 generates a plurality of radio waves 3-1 to 3-3 (hereinafter, referred to as antenna beams) with their comparatively narrow directivities to a plurality of stations 4-1 to 4-3.

By means of such antenna beams 3-1 to 3-3, the access point 1 can communicate with the plurality of stations 4-1 and 4-3 via the substantially same channel or adjacent channel while reducing interference between stations. That is, communication is executed between the access point 1 and the stations 4-1 to 4-3 each in accordance with the space division multiplexing access (SMDA) method.

In the above-described wireless LAN system, a description is given with respect to an example in which the access point 1 generates three antenna beams 3-1 to 3-3, thereby communicating with the three stations 4-1 to 4-3 at the same time. However, in the wireless communication system according to the embodiment of the present invention, the number of antenna beams and the number of stations carrying out simultaneous communication may be arbitrarily two or more. In addition, the stations 4-1 to 4-3 are generally installed in their fixed locations, but may be incorporated in a mobile unit.

Now, with reference to FIG. 2, a description will be given with respect to the access point 1 shown in FIG. 1 of a wireless LAN system to which the space division multiplexing access (SDMA) method according to the embodiment of the present invention has been applied.

Figure 2:
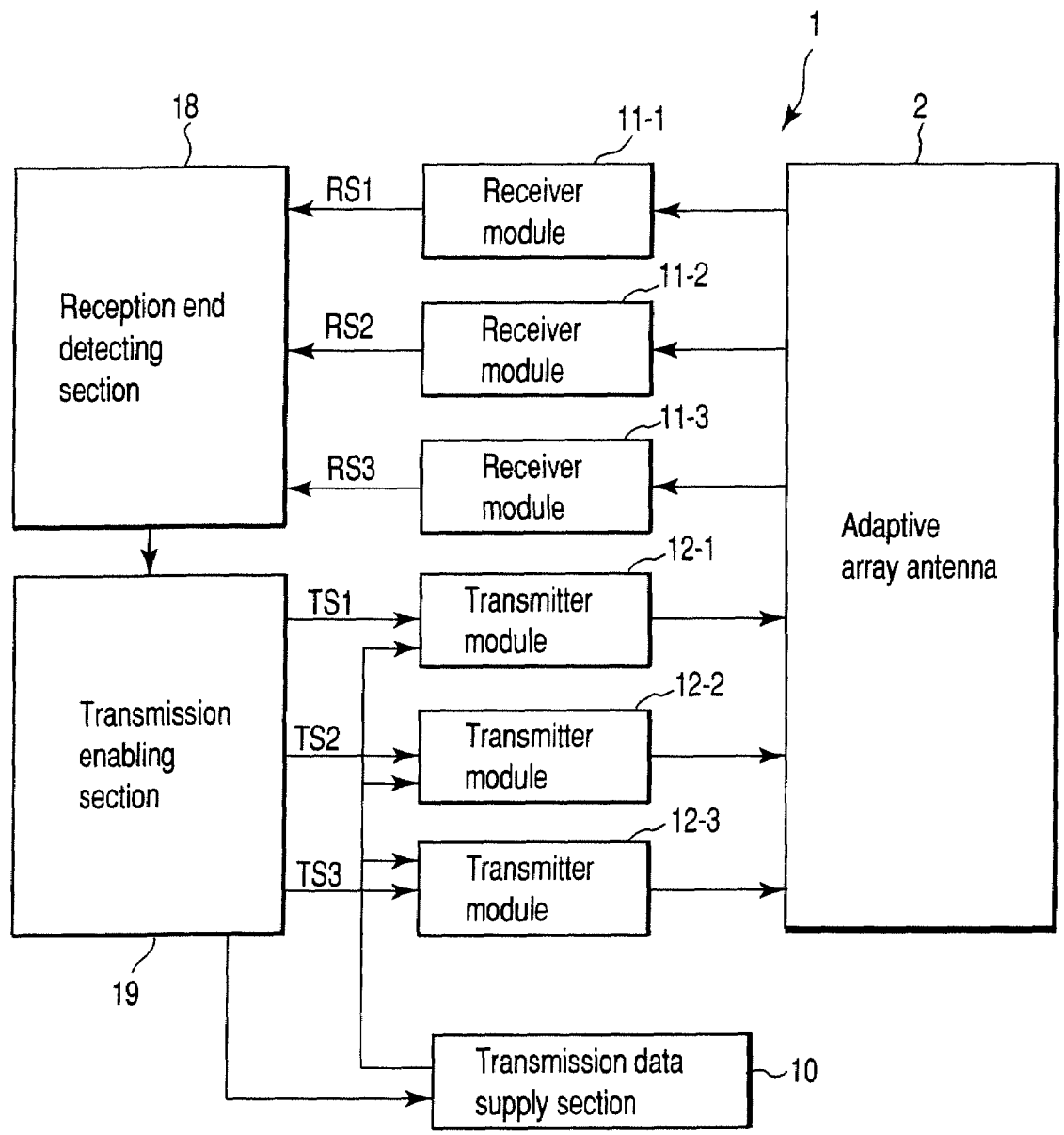
FIG. 2 is a block diagram schematically showing an access point shown in FIG. 1.

As shown in FIG. 2, the access point 1 comprises the adaptive array antenna 2 that forms the antenna beams 3-1 to 3-3 oriented to the stations 4-1 to 4-3 to communicate with the station 4-1 to 4-3. This adaptive array antenna 2 is connected to receiver modules 11-1 to 11-3. Therefore, reception signals carried by the antenna beams 3-1 to 3-3 oriented to these stations 4-1 to 4-3 are received at the receiver modules 11-1 to 11-3. At the receiver modules 11-1 to 11-3, reception signals are processed, and reception signals RS1 to RS3 are generated. Processing of this reception signal includes modulation and demodulation of the reception signal.

At the access point 1, transmitter modules 12-1 to 12-3 are connected to the adaptive antenna 2. At the transmitter modules 12-1 to 12-3, transmission signal s TS1 to TS3 to be transmitted to the stations 4-1 to 4-3 respectively are generated, and these transmission signal s TS1 to TS3 are supplied to the adaptive antenna 2. The transmission signal s TS1 to TS3 are transmitted to the wireless stations 4-1 to 4-3 by the antenna beams 3-1 to 3-3 formed by the adaptive array antenna 2.

The access point 1 comprises a reception end detecting section 18 and a transmission enabling section 19. In the reception mode for permitting the receiver modules 11-1 to 11-3 to receive a reception signal from the wireless stations 4-1 to 4-3, the reception end detecting section 18 detects a final transfer time in a reception signal in the receiver modules 11-1 to 11-3, thereby generating a reception end signal. The transmission enabling section 19 supplies a transmission enable signal to the transmitter modules 12-1 to 12-3 in response to the reception end signal. That is, the access point 1 is switched from the reception mode in response to the transmission mode to the transmission enable signal. The transmission enabling section 19 maintains the transmitter modules 12-1 to 12-3 in a transmission disable state in the reception mode, and the receiver modules 11-1 to 11-3 in a receiving disable state in the transmission mode. The transmission enabling section 19 switches the transmitter modules 12-1 to 12-3 from the transmission disable state to the transmission enable state in response to the transmission enable signal. In this way, in the transmission enable state, i.e., in the transmission mode, back-off processing is started in response to the transmission enable signal, thereby entering a transmission waiting state in which transmission is waited, and a transmission signal is transferred to each of the wireless stations 4-1 to 4-3. As described later, it is preferable that a data packet included in the transmission signal have the same packet length so that transmissions from the access point 1 to each of the wireless stations 4-1 to 4-3 terminate at the same time, and ACK signals are also transferred to the receiver modules 11-1 to 11-3 from the wireless stations 4-1 to 4-3 at the same time.

Figure 3:
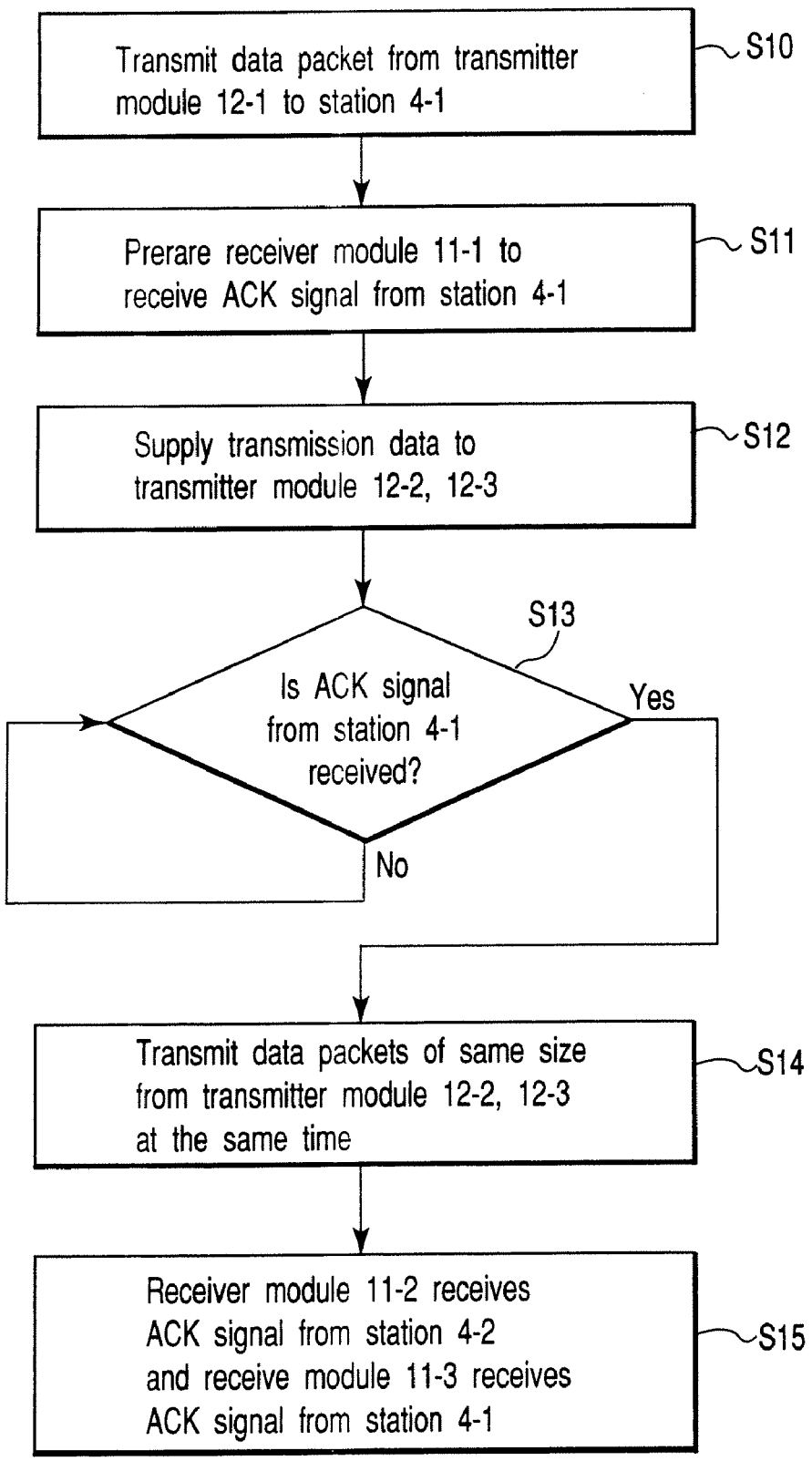
FIG. 3 shows a flow chart illustrating an operation of receiving and transmitting procedure in the access point shown in FIG. 1.

There will be described an example of operation procedures in the access point 1 shown in FIG. 2 with reference to FIG. 3. In the operation procedures shown in FIG. 3, the data packets each having a same packet size are transferred between the access point 1 and the wireless stations 4-1 to 4-3.

In the access point 1, the transmitter module 12-1 is supplied with transmission data from a transmission data supply section 10 and the transmission data is transmitted from the transmitter module 12-1 to the wireless station 4-1 in the transmission mode. The access point 1 is switched from the transmission mode to the reception mode, when the transmission of the transmission data from the access point 1 to the station 4-1 is ended, as shown in step S10 of FIG. 3. Thus, the receiver module 11-1 is prepared to receive ACK signal from the station 4-1, as shown in step S11. In this reception mode, the transmitter modules 12-1 to 12-3 are maintained in the transmission disable state. The transmission data is supplied to the transmitter 12-2 and 12-3 so that the transmission of the transmission data is prepared. In the access point 1, it is confirmed to receive ACK signal from the station 4-1 as shown in step S13. The access point 1 is maintained in the reception mode, if no ACK signal is received. The transmission enabling section 19 set the transmitter modules 12-1, 12-2, 12-3 in the transmission enabling state, when ACK signal is received as shown in step 13. The transmission data are transmitted from the transmitter modules 12-2, 12-3 to the station 4-2, 4-3 at the same time, after elapse of the waiting time, as shown in step S14. The transmission data is transmitted as data packets each having same packet length. The access point 1 is switched from the transmission mode to the reception mode after the transmission of the data packets is finished. In the reception mode, the receiver module can receive ACK signal from the stations 4-2, 4-3.

At the access point 1 provided with the reception end detecting section 18 and the transmission enabling section 19 as shown in FIG. 2, the transmissions from the transmitter modules 12-1 to 12-3 to the wireless stations 4-1 to 4-3 are started at the same time in the transmission waiting state of the transmission mode after transfer from all the wireless stations 4-1 to 4-3 to the receiver modules 11-1 to 11-3 has terminated. Therefore, at the access point 1, good communication between the access point 1 and the wireless stations 4-1 to 4-3 each can be established without causing interference between transmission and reception.

Figure 4:
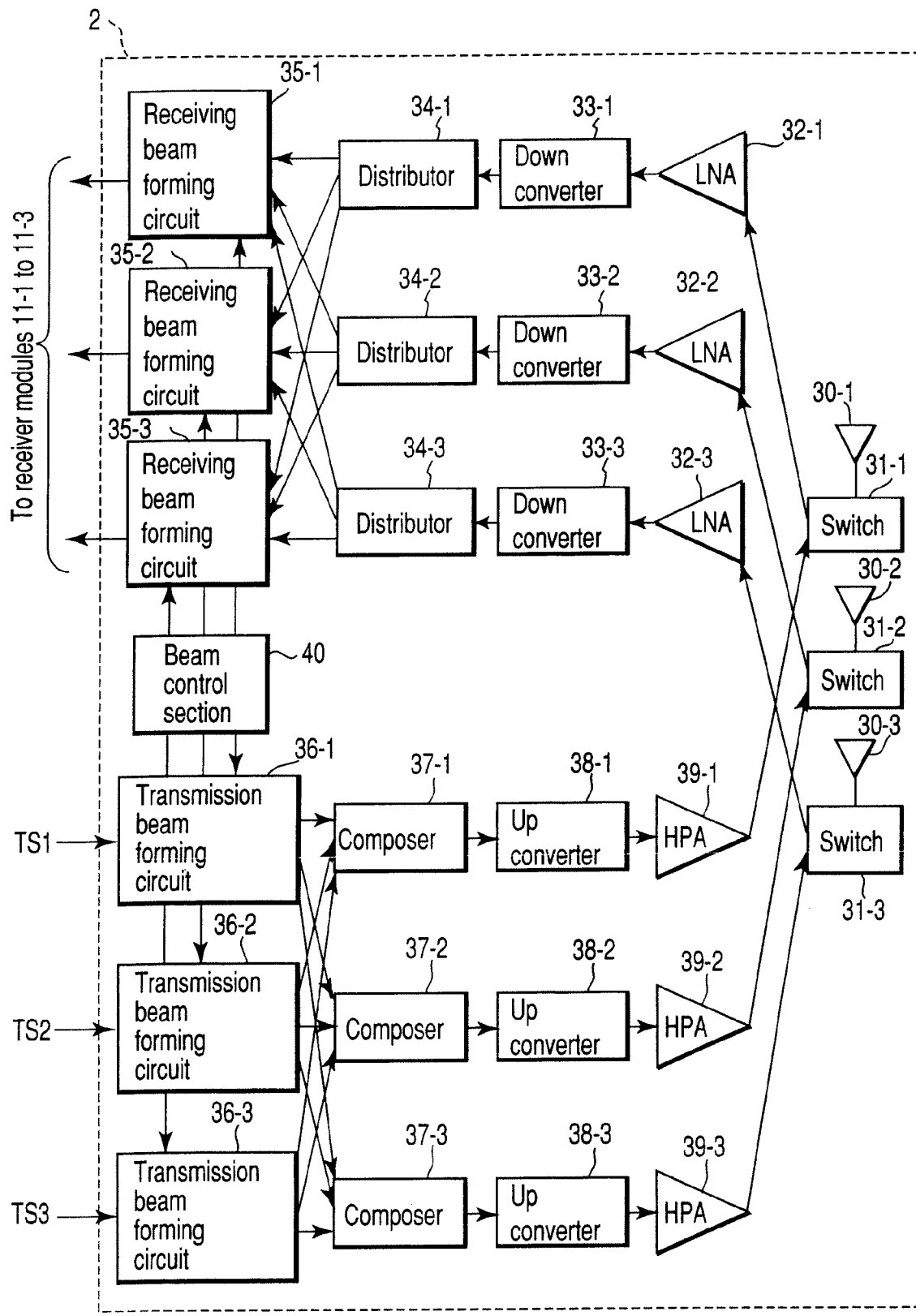
FIG. 4 is a block diagram schematically showing an adaptive array antenna shown in FIG. 1.

Now, the adaptive array antenna shown in FIG. 2 will be described in detail with reference to FIG. 4. FIG. 4 shows a specific example of circuit configuration of the adaptive array antenna 2 shown in FIG. 2.

The adaptive array antenna 2, as shown in FIG. 4, comprises antenna elements 30-1 to 30-3 for receiving an RF signal, transmission/reception changeover switches 31-1 to 31-3 for switching one of transmission mode and reception mode, low noise amplifiers (LNAs) 32-1 to 32-3 for amplifying a received RF signal with a low noise, and down converters 33-1 to 33-3 for converting a frequency bandwidth from a radio frequency (RF) of an RF signal to an intermediate frequency (IF) or base band (BB). In addition, the adaptive array antenna 2 comprises distributors 34-1 to 34-3 for distributing output signals from the down converters 33-1 to 33-3, and receiving beam forming circuits 35-1 to 35-3 for weighting and combining input signals distributed in accordance with a reception complex weighting coefficient set by a beam control section 40, and forming a reception signal corresponding to each reception antenna beam as a result of such weighting and combining. Further, the adaptive array antenna 2 comprises transmission beam forming circuits 36-1 to 36-3 for forming a transmission beam signal to form transmission beams by weighting the transmission signal in accordance with the transmission complex weighting coefficient set by the beam control section 40, and composers 37-1 to 37-3 for composing transmission beams from the transmission beam signals. Furthermore, the adaptive array antenna 2 comprises up converters 38-1 to 38-3 for converting an intermediate frequency (IF) or a base band into a radio frequency (RF) of an RF signal, power amplifiers 39-1 to 39-3 (hereinafter, simply referred to as PA) for amplifying an RF signal, and the beam control section 40.

The transmission/reception changeover switches 31-1 to 31-3, LNA 32-1 to 32-3, down converters 33-1 to 33-3, distributors 34-1 to 34-3, composers 37-1 to 3-3, up converters 38-1 to 38-3, and PAs 39-1 to 39-3 correspond to the respective antenna elements 30-1 to 30-3, and are provided to be equal to the antenna elements 30-1 to 30-3 in number (three elements in this example). On the other hand, the receiving beam forming circuits 35-1 to 35-3 and transmission beam forming circuits 36-1 to 36-3 are provided to be equal to antenna beams formed by the adaptive antenna 2 in number (three beams in this example). The number of antenna beams may be smaller or greater than that of the antenna elements 30-1 to 30-3.

Now, an operation of the adaptive array antenna 2 shown in FIG. 4 will be briefly described below.

At the adaptive array antenna 2, the RF signals received by the antenna elements 30-1 to 30-3 are inputted to the LNAs 32-1 to 32-3 via transmission or reception changeover switches 31-1 to 31-3, respectively, and the inputted signals are amplified at a predetermined level. The RF signals amplified by the LNAs 32-1 to 32-3 are inputted to the down converters 33-1 to 33-3, respectively. The frequency bandwidth is converted from the radio frequency (RF) into the intermediate frequency (IF) or base band (BB), and the converted signal is inputted to the distributors 34-1 to 34-3.

The distributor 34-1 distributes output signals from the down converters 33-1 to 33-3 to the receiving beam forming circuit 35-1. The distributor 34-2 distributes output signals from the down converters 33-1 to 33-3 to the receiving beam forming circuit 35-2. The distributor 34-3 distributes output signals from the down converters 33-1 to 33-3 to the receiving beam forming circuit 35-3.

The beam control section 40 sets a reception complex weighting coefficient. At the receiving beam forming circuits 35-1 to 35-3, the input signals are weighted and combined in accordance with this reception complex weighting coefficient. As a result, a plurality of reception antenna beams are formed. The signals corresponding to the reception antenna beams from the receiving beam forming circuits 35-1 to 35-3 are supplied to the receiver modules 11-1 to 11-3 in FIG. 2, respectively.

On the other hand, transmission signal s TS1 to TS3 from the transmitter modules 12-1 to 12-3 shown in FIG. 4 are inputted to the transmission beam forming circuits 36-1 to 36-3, respectively. At the transmission beam forming circuits 36-1 to 36-3, a plurality of transmission complex weighting coefficients set by the beam control section 40 are multiplied relevant to the respectively inputted transmission signal s.

A plurality of output signals from the transmission beam forming circuit 36-1 are inputted to the composers 37-1 to 37-2. A plurality of output signals from the transmission beam forming circuit 36-2 are also inputted to the composers 37-1 to 37-3 similarly. A plurality of output signals from the transmission beam forming circuit 36-3 are also inputted to the composers 37-1 to 37-3 similarly. At the composers 37-1 to 37-3, a plurality of signals inputted respectively are composed into one signal.

The output signals from the composers 37-1 to 37-3 are inputted to the up converters 38-1 to 38-3, respectively. The frequency bandwidth is converted from the intermediate frequency (IF) or base band (BB) into the radio frequency (RF), and then, the converted signal is inputted to the PAs 39-1 to 39-3. The transmission signal s amplified by the PAs 39-1 to 39-3 are supplied to the antenna elements 30-1 to 30-3 respectively via the switches 31-1 to 31-3, and the supplied signals are transmitted to the stations.

At the beam control section 40, as described previously, a reception complex weighting coefficient is set at the receiving beam forming circuits 35-1 to 35-3 each, and a transmission complex weighting coefficient is set at the transmission beam forming circuits 36-1 to 36-3 each. During transmission and reception, a weighting coefficient for communicating with the same station is set at the mutually corresponding beam forming circuits, for example, the receiving beam forming circuit 35-1 and the transmission beam forming circuit 36-3.

Now, the reception end detecting section 18 shown in FIG. 2 will be described in detail with reference to FIG. 5.

Figure 5:
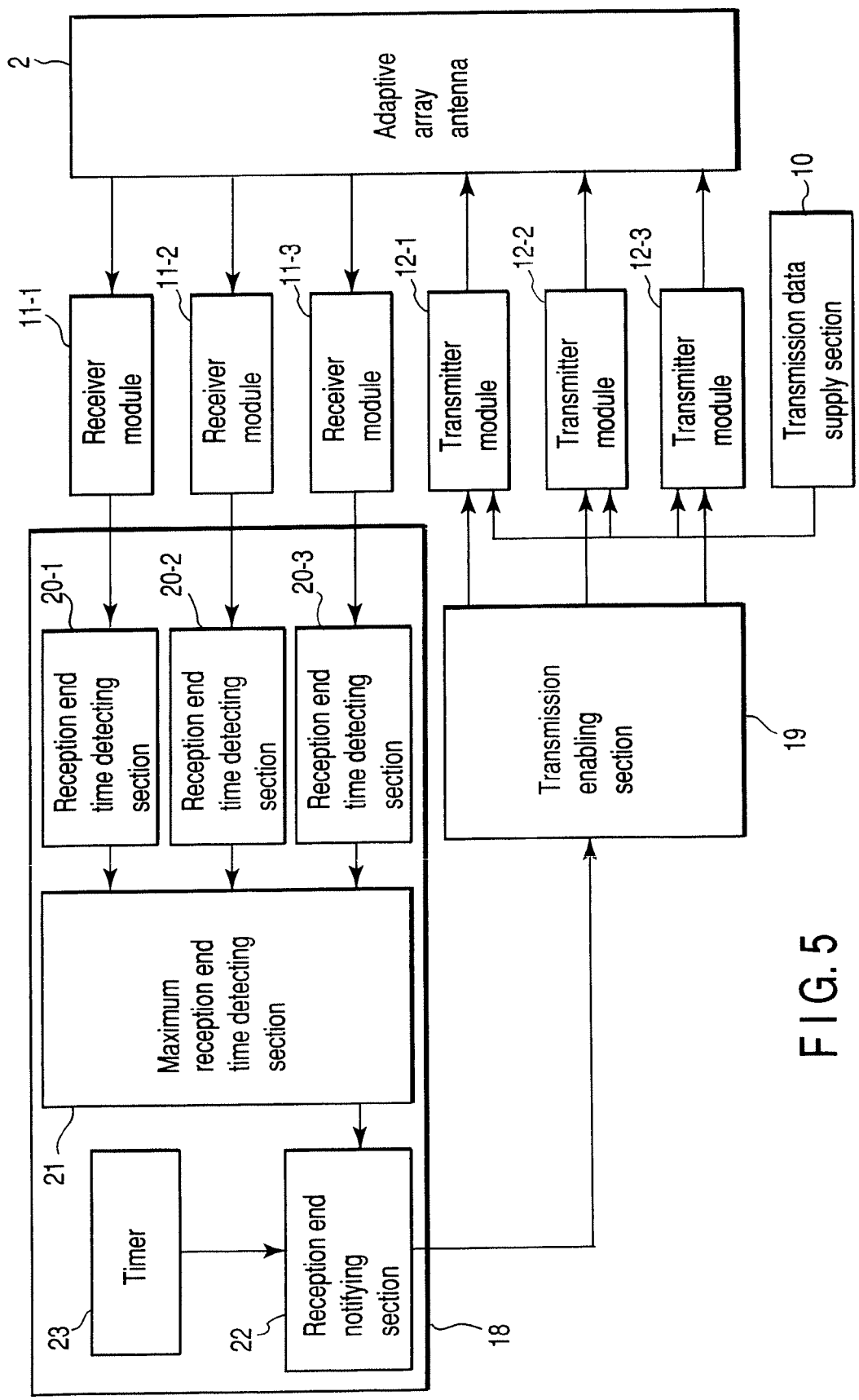
FIG. 5 is a block diagram schematically showing details of a maximum reception end time detecting section shown in FIG. 2.

FIG. 5 is a block diagram showing the reception end detecting section 18 shown in FIG. 2. As shown in FIG. 5, the reception end detecting section 18 comprises detecting sections 20-1, 20-2, and 20-3 in which a header of a data packet included in reception signals from the receiver modules 11-1 to 11-3 each is inputted and which detect a reception end time from time information from the header, a detecting section 21 for detecting a maximum value of the reception end time detected by the detecting sections 20-1, 20-2, and 20-3 each, and a notifying section 22 notifying that the maximum value of this reception end time is set, and reception terminates when the maximum reception end time is counted by a counter 23.

Figure 6:
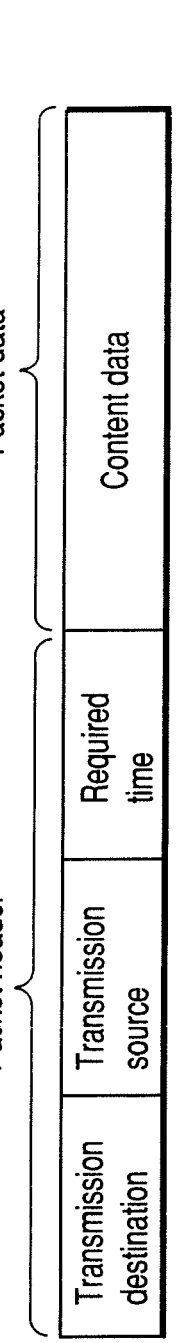
FIG. 6 and FIG. 7 are schematic views each showing a structure of a data packet to be transferred between an access point and a wireless station shown in FIG. 1.

The reception signal inputted to the receiver modules 11-1 to 11-3 each includes a data packet, and this data packet has a data structure as shown in FIG. 6 as an example. This data packet comprises a transmission destination for specifying the receiver modules 11-1 to 11-3, a transmission source for specifying the wireless stations 4-1 to 4-3, a packet header having described therein a predetermined time period required from the start of reception of this data packet to the end of such reception, and packet data having stored therein content data such as video image, voice, text, or program.

When a packet is inputted to the receiver modules 11-1 to 11-3 each, in the reception mode, the reception start time of the packet is established at a clock (not shown), and the predetermined time period in the packet header is isolated from the packet. The required time and packet reception start time TS are sent to the detecting sections 20-1, 20-2, and 20-3, respectively. At these detecting sections 20-1, 20-2, and 20-3, the predetermined time periods Tr1, Tr2, and Tr3 (for example, Tr1<Tr2<Tr3) are added to the packet reception start time TS, and times (TrS+Tr1, TrS+Tr2, TrS+Tr3) required for the completion of this packet reception are obtained. These reception completion times (TrS+Ts1, TrS+Tr2, TrS+Tr3) are provided to the detecting section 21. At the detecting section 21, the reception completion times (TrS+Tr1, TrS+Tr2, TrS+Tr3) are compared with each other, and the maximum time of these reception completion times (TrS+Tr1, TrS+Tr2, TrS+Tr3), for example, the maximum time (TrS+Tr3) is obtained. This time (TrS+Tr3) is set at the reception end notifying section 22, and a timer 23 monitors this time (TrS+Tr3). A timer 14 is composed of a digital counter, for example, and a current time TC is clocked. At the reception end notifying section 22, when the time being monitored reaches the maximum time (TrS+Tr3), the reception end signal is provided from the notifying section 22 to a transmission enabling section 19. This transmission enabling section 19 provides a transmission enable signal to each of the transmitter modules (12-1, 12-2, 12-3) in response to the reception end signal, changes a current state from a transmission disable state to a transmission enable state, and enables transmission. That is, the access point 1 is changed in the transmission mode from the reception mode in response to the reception end signal.

Figure 7:
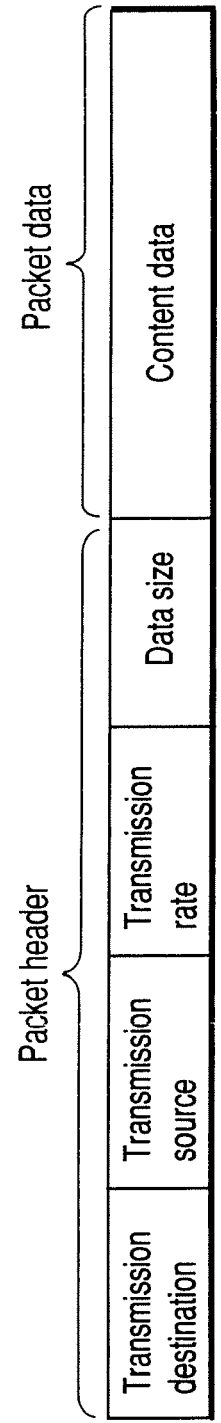

A packet structure shown in FIG. 6 is provided as an example, and may be another structure. For example, as shown in FIG. 7, a description of a predetermined time period 'Tx' may not be given at the packet header, and a transmission rate and a packet data size may be described instead of the description of the predetermined time period. In this packet as shown in FIG. 7, the time period 'Tx' required for packet transfer is obtained from the description of the transmission rate and data size. That is, at the detecting sections 20-1, 20-2, and 20-3, the described data size is divided at the transmission rate, whereby the time period 'Tx' required to transmit that packet can be obtained.

The transmission enabling section 19 shown in FIG. 2 will be described with reference to FIG. 8.

Figure 8:
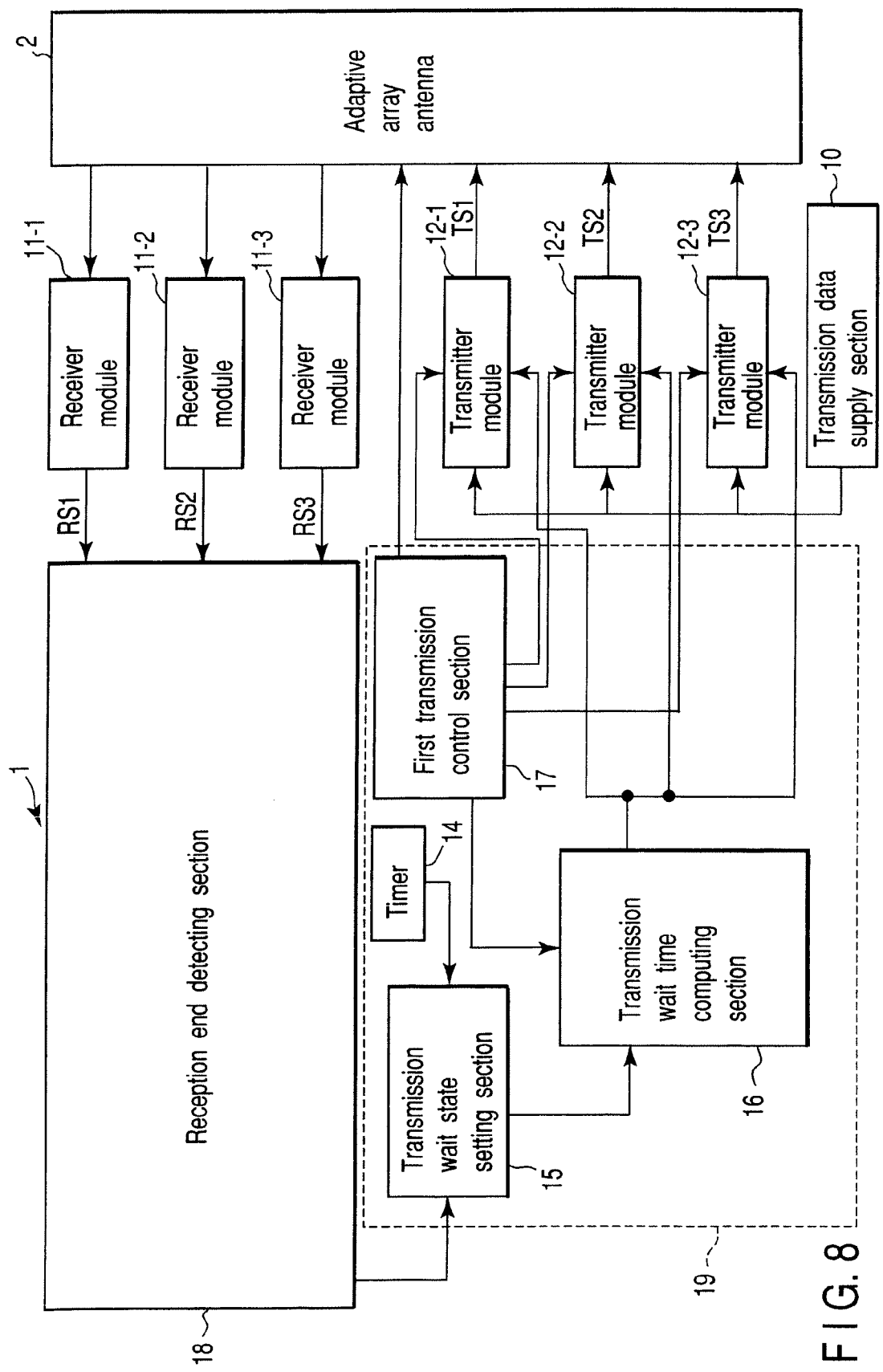
FIG. 8 is a block diagram schematically showing details of a transmission enabling section shown in FIG. 2.

FIG. 8 shows a circuit block of the transmission enabling section 19 shown in FIG. 2. This transmission enabling section 19 comprises a setting section 15 for setting transmission at a waiting state. When the current time Tc clocked by the timer 14 reaches the maximum time Tt3 at which the end of transmission is predetermined, this setting section 15 sets a transmission waiting state in the transmission mode, in which transmission to the transmission enabling section 19 is waited. For example, the setting section 15 sets a flag, i.e., a start flag for computing a time period in which transmission is waited, at a computing section 16 for computing a time period at which transmission is waited. The transmitter modules 12-1 to 12-3 and the computing section 16 for computing a transmission waiting time is controlled by a first transmission control section 17.

When there exists packet data to be transmitted from the access point 1 to at least one of the wireless stations 4-1 to 4-3, the first transmission control section 17 specifies at least one transmitter module for transmitting the packet data from among the transmitter modules 12-1 to 12-3, specifies an address (hereinafter, referred to as destination or transmission destination address) of a destination station, i.e., a target station to which data is to be transmitted for the thus specified transmitter module, and specifies data to be transmitted. At the same time as this specification, the first transmission control section 17 sets a flag, i.e., an enable flag for enabling computation of the transmission wait time, at the computing section 16 for computing a transmission waiting time period. Transmission data specified for the transmitter modules 12-1 to 12-3 by the first transmission control section 17 does not correspond to original data, and corresponds to data to be transmitted in a wireless interval, i.e., modulated data and error corrected data. This transmission data has a data packet structure in which a packet header is provided to the packet data as shown in FIG. 6 or FIG. 7. To the packet data, there is provided address information such as transmission source corresponding to a transmission destination address of the access point or a transmission destination specified by a destination address, and time information or the like required for transfer of transmission data.

When an enable flag is set by the first transmission control section 17, and a start flag for starting a transmission wait is set by the transmission waiting state setting section 15, a time period in which a transmission waiting state is maintained from a time at which a transmission waiting state is set, i.e., a transmission wait time period is computed in random by the computing section 16. When a time period for this transmission wait has elapsed, a transmission instruction is provided from the computing section 16 to a transmitter module to which data is to be transmitted, of the transmitter modules 12-1 to 12-3. Then, the set data is transmitted to a wireless station of the set destination address via the adaptive array antenna 2.

After one or a plurality of transmitter modules 12-1, 12-2, and 12-3 start(s) transmission at the same time after the elapse of the wait time period, if a length of a packet to be transmitted is constant, transmission is terminated at the same time.

A more detailed circuit block diagram for providing the reception end detecting section 18 shown in FIG. 5 and showing the reception end detecting section 18 adaptive to the circuit shown in FIG. 8, will be described with reference to FIG. 9.

Figure 9:
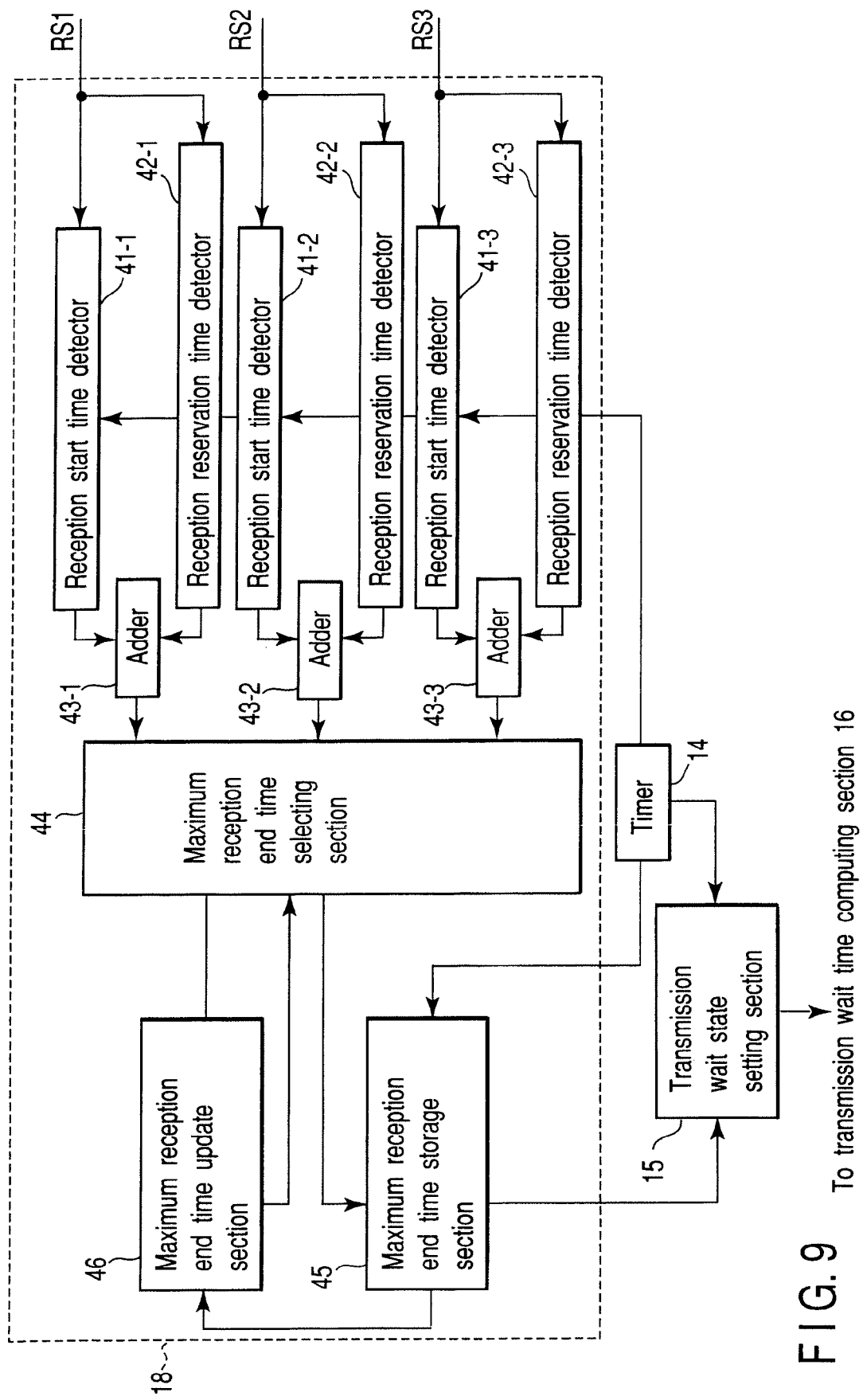
FIG. 9 is a block diagram schematically showing a more detailed exemplary circuit of a maximum reception end time detecting section shown in FIG. 2.

The reception end detecting section 18 shown in FIG. 9 is composed of reception start detectors 41-1 to 41-3 for detecting a reception starting time, and reception reservation detectors 42-1 to 42-3 for detecting a time period reserved for reception. The detecting section 18 further comprises adders 43-1 to 43-3 for adding a reception reservation period to the reception start time, thereby obtaining the predetermined time at which reception is terminated, a selecting section 44 for selecting a maximum value from a plurality of reception end times, a storage section 45 for storing the maximum value of the selected reception end time, and an update section 46 for updating a maximum reception end time.

Now, an operation of the detecting section 13 for detecting the maximum reception end time shown in FIG. 9 will be described here.

At the detectors 41-1 to 41-3 for detecting a reception start time, a transmission start time of a station being a transmission source is detected from the reception signals RS1 to RS3. This transmission start time is detected as a time at which a first packet of the reception signals RS1 to RS3 each is detected, i.e., a time at which the wireless stations 4-1 to 4-3 being transmission sources transmit the packet.

At the detectors 42-1 to 42-3 for detecting a reception reservation time period, a transmission reservation time period corresponding to a time period for the stations 4-1 to 4-3 each being a transmission source to reserve a communication channel for the purpose of transmission is detected from the packet header of the reception signals RS1 to RS3 each.

At the adders 43-1 to 43-3, the reception start time and reception reservation time period detected from the reception signals RS1 to RS3 respectively are added, whereby the reception end time of the reception signals RS1 to RS3 each is computed.

The selecting section 44 selects the maximum reception end time that is the latest reception end time on the time-by-time base, of the reception end times of the reception signals RS1 to RS3 obtained by the adders 43-1 to 43-3. Information on the selected maximum reception end time is provided to the storage section 45 and the update section 46. The maximum reception end time is stored in the maximum reception end time storage section 45.

At the maximum reception end time update section 46, when the maximum reception end time selected by the selecting section 44 is greater than the maximum reception end time stored in the storage section 45, the contents of the storage section 45 are updated in accordance with the maximum reception end time selected by the selecting section 44.

That is, when the maximum reception end time selected by the selecting section 44 is greater than the maximum reception end time stored in the maximum reception end time storage section 45, the update section 46 sets a write flag at the maximum reception end time selecting section 44. In this manner, a predetermined end time newly selected at the pre-determined maximum end time selecting section 44 is written in the maximum reception end time storage section 45.

The information on the maximum reception end time thus stored in the storage section 45 is outputted from the maximum reception end time detecting section 14. Then, the outputted information is inputted to the transmission waiting state setting section 15 shown in FIG. 8.

The subsequent operation is as described previously. When the maximum reception end time detected by the detecting section 14 and stored in the storage section 45 matches the current time clocked by the timer 14, the reception waiting state is set by the setting section 15. When the reception waiting state is set, the computing section 16 computes a random transmission wait time. After the elapse of this transmission wait time, transmission is instructed simultaneously to the transmitter modules 12-1 to 12-3. That is, back-off processing is carried out for all the transmission modules 12-1 to 12-3.

In this manner, to the stations 4-1 to 4-3 of destination addresses set at the transmission modules 12-1 to 12-3 by the first transmission control section 17, packets of data set at the transmitter modules 12-1 to 12-3 are transmitted via the adaptive array antenna 2 at the same time.

FIG. 10 shows the above-described exemplary operation. "ts1" to "ts3" denote the reception start times of the reception signals RS1 to RS3, Trs1 to Trs3 denote the reception reservation times of the reception signals RS1 to RS3, and "te1" to "te3" denote the reception end times of the reception signals RS1 to RS3, provided that te1=ts1+Trs1, te2=ts2+Trs2, and te3=ts3+Trs3. In this example, the reception end time "te2" denotes the predetermined maximum end time "temax". After the elapse of a reception wait time "Twait" from "temax", transmissions from the transmitter modules 12-1 to 12-3 are started simultaneously.

In this manner, according to the present embodiment, back-off processing is used in common by the transmitter modules 12-1 to 12-3, and packet transmissions to the stations 4-1 to 4-3 are carried out at the same time, thus making it possible to prevent collision between transmission and reception in the access point 1. Therefore, the back-off processing is effective in communication in which a reception acknowledge is not made by an ACK (acknowledge response) packet, for example, in increasing the success rate of a broadcast, for example.

On the other hand, in a method in which the stations 4-1 to 4-3 transmits an ACK packet and executes a reception acknowledge when they receives transmission packets from the access point 1, it is desirable that the first transmission control section 17 for controlling transmission to the access point 1 be equal to a size (time length) of data to be set at the transmitter modules 14-1 to 12-2.

By doing this, ACK packet transmissions from the stations 4-1 to 4-3 occur at the same time. Thus, ACK packet transmitted by one station can be prevented from interfering with another station. Therefore, the completion of data packet reception is acknowledged in accordance with the ACK packet. This method is effective in transmission other than broadcast transmission. Of course, when the same data is transmitted to a plurality of stations as in broadcast transmission, ACK packet reception is acknowledged. As a result, the reliability can be improved.

From the transmitter modules 12-1 and 12-2, simultaneous transmission to the stations 4-1 and 4-3 is started respectively via the antenna beams 3-1 and 3-2. Then, where transmission to one station, for example, the station 4-1, first terminates, and where there exists a station at which transmission does not terminate, for example, the station 4-2, a data packet may be transmitted to the station 4-2 by the transmitter module 12-1 for use in transmission to the station 4-1 at which transmission terminates, via the antenna beam 3-1 for use in transmission to the station 4-1. By doing this, the station 4-1 carries out carrier sensing and enters a back-off period. Thus, the station 4-1 can be prevented from transmitting a signal, which interferes with another station. Such control is carried out by the first transmission control section 17.

Further, after simultaneous transmissions are started from the transmitter modules 12-1 and 12-2 to the stations 4-1 and 4-3 via the antenna beams 3-1 and 3-2, respectively, where transmission to one station, for example, the station 4-1 first terminates, and there exists a station at which transmission does not terminate, for example, the station 4-2, a directivity pattern of the antenna beam 3-2 may be changed so that transmission antenna beam corresponding to the station 4-2, for example, the antenna beam 3-2 has a directivity gain in the direction of the station 4-2. Even by doing this, the station 4-1 carries out carrier sensing and enters the back-off period. Thus, the station 4-1 can be prevented from transmitting a signal, which interferes with another station.

An access point 1 in a wireless communication system according to a second embodiment of the present invention will be described with reference to FIG. 11.

Figure 11:
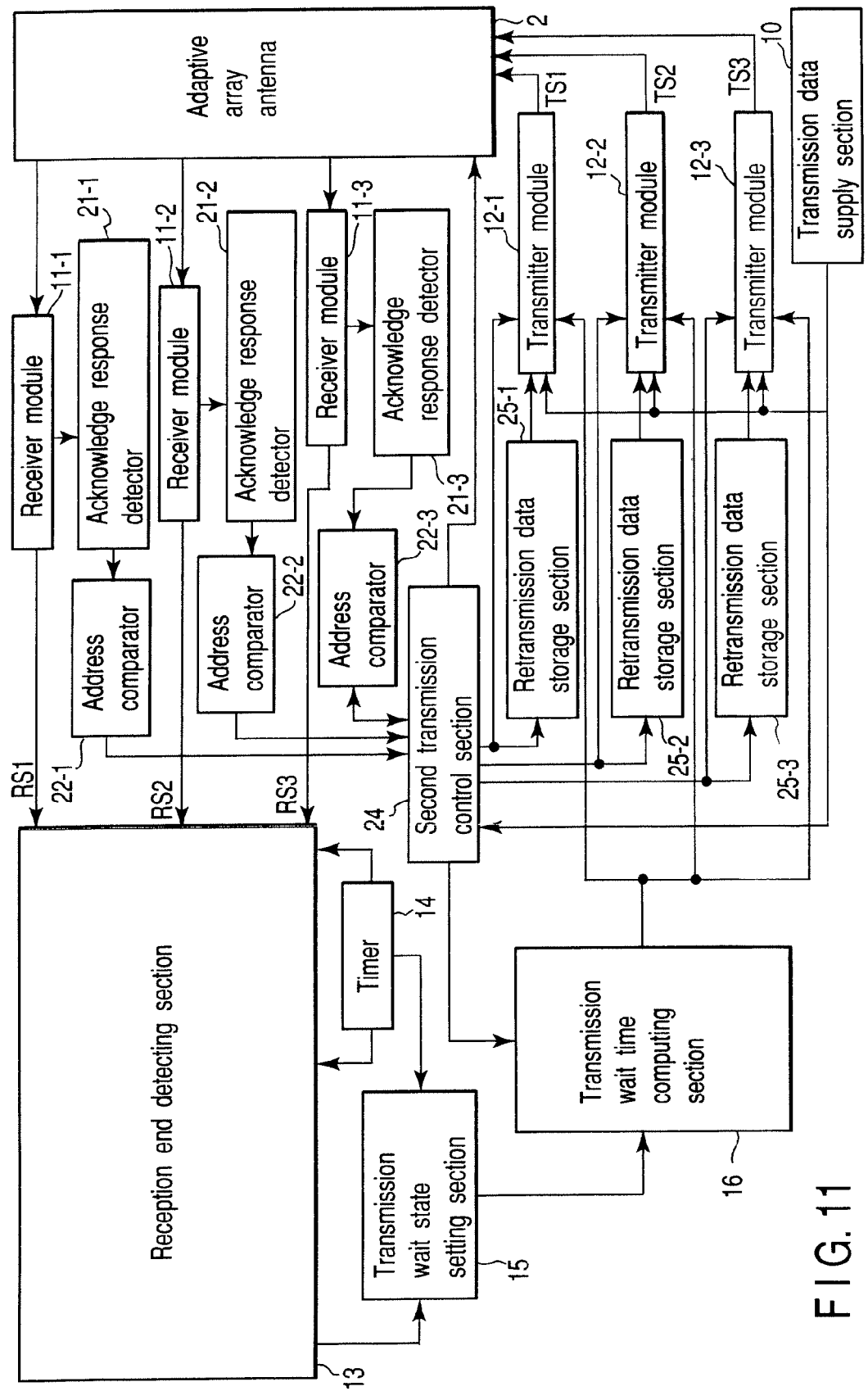
FIG. 11 is a block diagram schematically showing an access point according to another embodiment of the present invention.

At the access point 1 shown in FIG. 11, detectors 21-1 to 21-3 for detecting an acknowledge response (ACK), address comparators 22-1 to 22-3, and retransmission data storage sections 25-1 to 25-3 are added to the access point 1 shown in FIG. 8. Further, a second transmission control section 24 is provided instead of the first transmission control section 17 shown in FIG. 8.

The second transmission control section 24 has a function for outputting to the retransmission data storage sections 25-1 to 25-3 the destination addresses to be set to the transmitter modules 12-1 to 12-3 and data to be retransmitted, in addition to a function of the first transmission control section 17. The destination address and retransmission data stored in the retransmission data storage sections 25-1 to 25-3 are used during data retransmission. Further, the destination addresses to be set at the transmitter modules 12-1 to 12-3 are outputted to address comparators 22-1 to 22-3 as well. The transmission data is supplied to the corresponding transmitter module 12-1 to 12-3 and is also supplied to the retransmission data storage sections 25-1 to 25-3 under the control of the second transmission control section 24 from the data supply section 10 so that the retransmission data is stored in the storage sections 25-1 to 25-3

Acknowledge response signals (ACK packets) are transmitted from the stations 4-1 to 4-3 to the receiver modules 11-1 to 11-3, respectively and received at the receiver modules 11-1 to 11-3. This received acknowledge response signals are inputted to the detectors 21-1 to 21-3, and are detected, respectively. At the acknowledge response detectors 21-1 to 21-3, station addresses (transmission address) which denotes the ACK packet transmission source or station is detected from the ACK packets inputted respectively, and these addresses are outputted to the address comparators 22-1 to 22-3, respectively.

The address comparators 22-1 to 22-3 compare the destination address outputted from the second transmission control section 24 with the transmission source addresses inputted from the acknowledge response detectors 21-1 to 21-3 respectively, and detects consistency/inconsistency of these addresses. Where consistency is obtained, an address consistency flag is set at the second transmission control section 24.

The second transmission control section 24 checks whether or not the address consistency flag is set at the address comparators 22-1 and 22-2 after a predetermined time clocked by the timer 14 at a time when a data packet is transmitted from the transmitter modules 12-1 to 12-3. As a result, where the address consistency flag is not set at least at one of the address comparators 22-1 and 22-2, i.e., where the destination address and transmission source address are inconsistent at least at one of the address comparators 22-1 and 22-2, the second transmission control section 24 resets the destination address and data stored in the retransmission data storage sections 25-1 to 25-3 at the transmitter modules 12-1 to 12-3. In addition, this control section sets an enable flag for enabling computation of a transmission wait time at the computing section 16 for computing the transmission wait time.

When a random transmission wait time is thus computed at the transmission wait time computing section 16, and this transmission wait time elapses, transmissions are instructed simultaneously from the second transmission control section 24 to the transmitter modules 12-1 to 12-3. Then, data packets are retransmitted at the same time from the transmitter modules 12-1 to 12-3 to the stations 4-1 to 4-3 via the adaptive array antenna 2.

As has been described, according to the present embodiment, it is determined that the ACK packets are received from the plurality of stations 4-1 to 4-3 at the same time. Further, back-off processing is carried out in common at the transmitter modules 12-1 to 12-3, and packets are retransmitted to the stations 4-1 to 4-3 at the same time. Therefore, even during packet retransmission, the collision between transmission and reception at the access point 1 can be prevented.

In the foregoing description, where the destination address and transmission source address are inconsistent at least at one of the address comparators 22-1 and 22-2, in other words, even where only one station does not transmit an ACK packet, packets are retransmitted to all the stations 4-1 to 4-3. However, a packet may be retransmitted to only a station, which does not transmit an ACK packet, and a new data packet may be transmitted to a station, which has transmitted such ACK packet, whereby the performance of the entire system can be improved.

Where a predetermined number or more is obtained after counting the number of retransmissions, packet retransmission to a station, which does not transmit an ACK packet, is canceled, whereby the performance of the entire system can be prevented from being lowered by a specific station whose reception state is poor.

A transmitter module deactivated by cancellation of packet retransmission, or alternatively, a transmission module deactivated by the end of normal transmission, is assigned to transmission to another station, whereby the performance of the entire system can be improved. Further, combination with a physical carrier sense can be obtained.

These controls are executed by the second transmission control section 24.

A wireless communication system according to a third embodiment of the present invention will be described with reference to FIG. 12.

Figure 12:
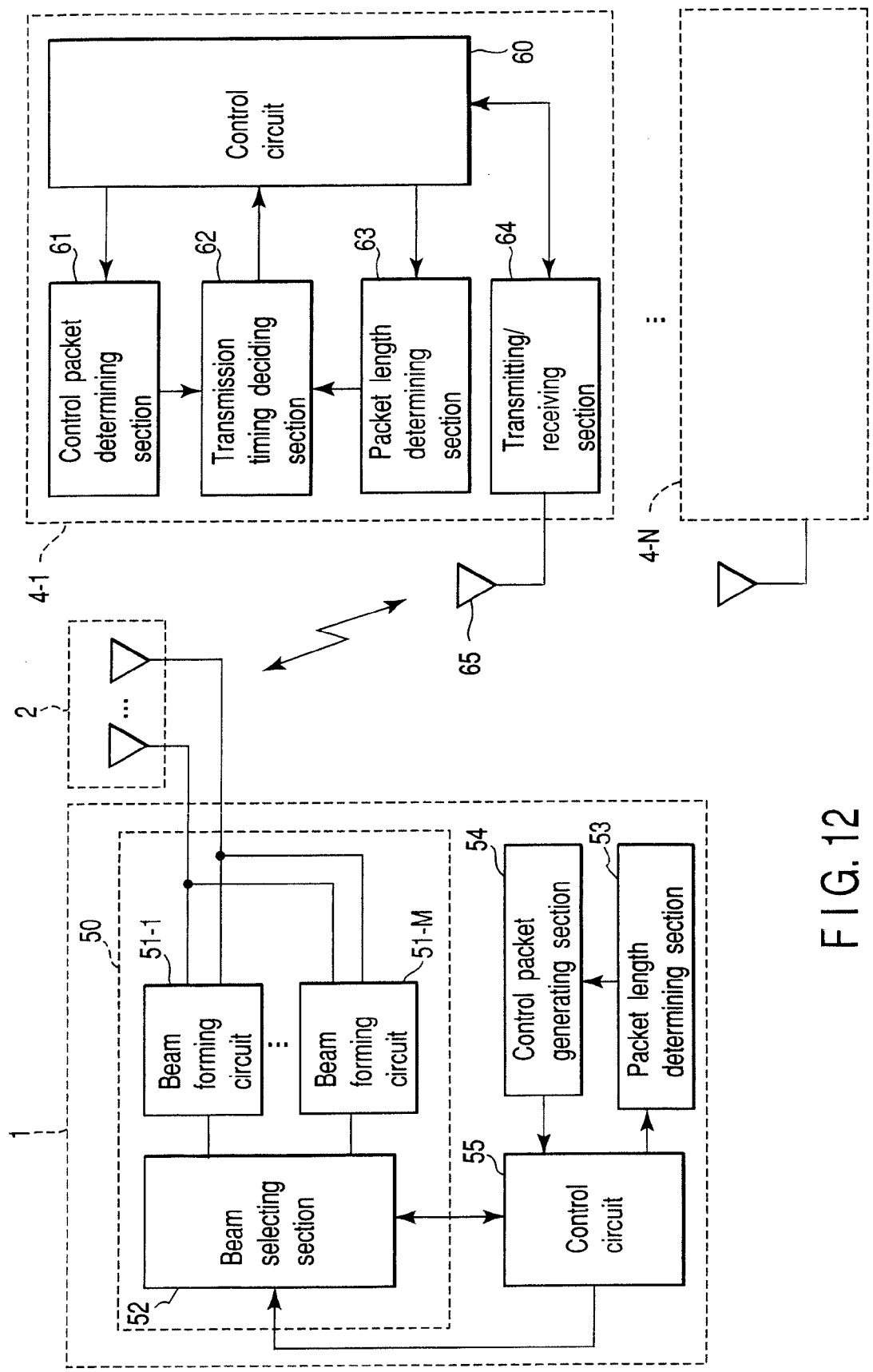
FIG. 12 is a block diagram schematically showing an access point and a wireless communication station in a wireless LAN system according to another embodiment of the present invention.

The access point 1 shown in FIG. 12 comprises a array antenna 2 capable of dividing a space in accordance with a plurality of antenna beams, beam forming circuits 51-1 to 51-M for forming M antenna beams, and a beam selecting section 52 for selecting one of the antenna beams formed by the beam forming circuits 51-1 to 51-M. Further, the access point 1 comprises a packet length determining section 53 for determining a packet length of a reception signal, a control packet generating section 54 for generating a control packet for causing another station to recognize the predetermined maximum end time of a station when transmission has been carried out from the access point 1, and a control section 55. The control packet generated from the control packet generating section 54 includes a frame control for designating that this packet is a control packet, a duration required for transmitting the data packet, a receiver address for designating the station to which the control packet will be transmitted, and a frame check sequence for checking errors of the data packet.

On the other hand, stations 4-1 to 4-N has such a configuration as to communicate with only the access point 1 without receiving a signal transmitted from another station. These stations each comprise a control section 60, a control packet determining section 61 for determining the contents of control packets transmitted from the access point 1, a transmission timing deciding section 62 for deciding a transmission timing of a signal, i.e. a packet, to be transmitted by the station, a packet length determining section 63 for determining a packet length of a reception signal from the access point 1, a transmitting/receiving section 64, and an antenna 65.

Figure 14:
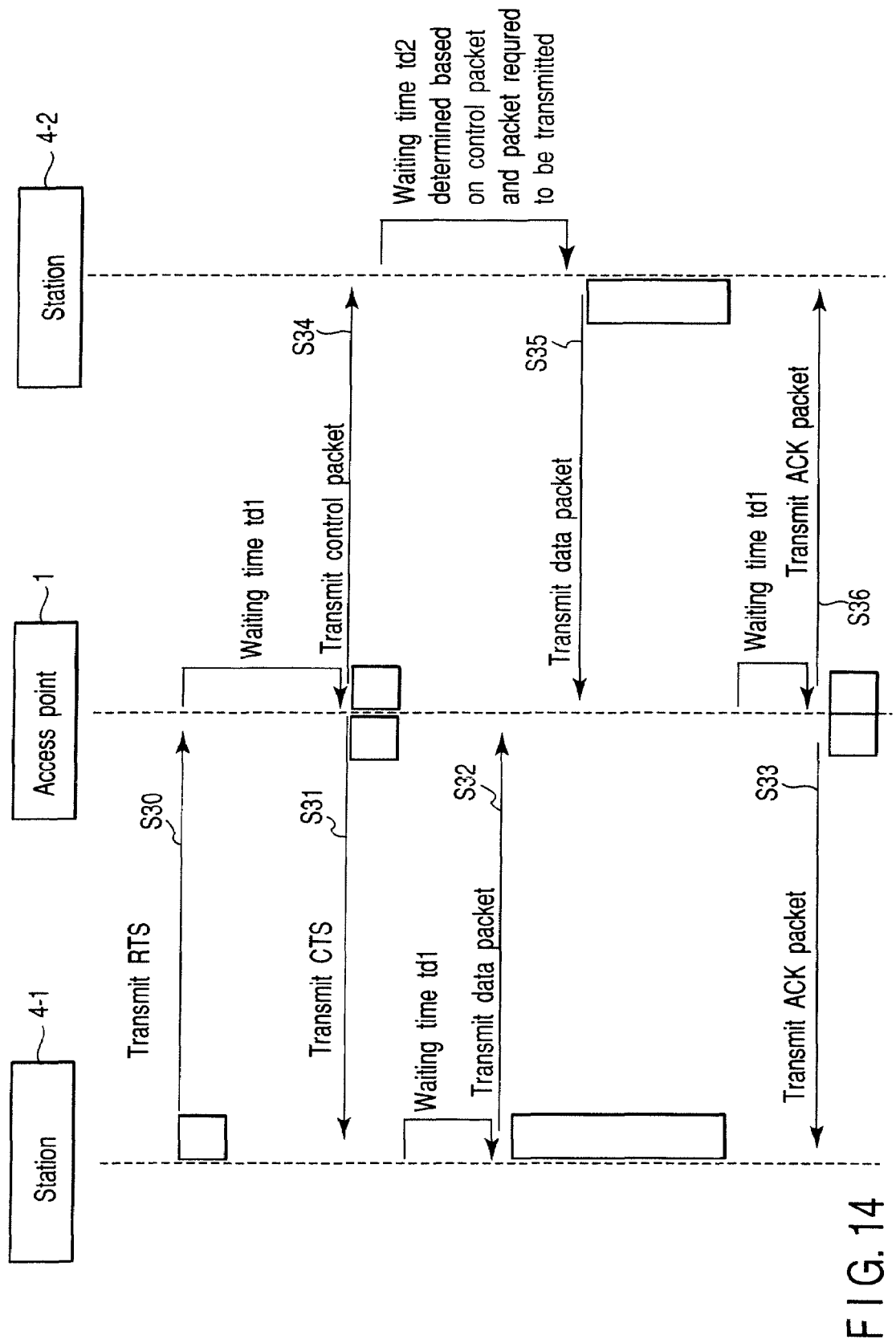
FIG. 14 is a schematic view showing operation of receiving and transmitting procedures in wireless LAN system shown in FIG. 12.

The wireless communication system shown in FIG. 12 is operated as shown in FIG. 14.

When a transmission request occurs, if a control packet shown in FIG. 12 or a data packet transmitted from the access point 1 is not received, the station 4-1 sets at the transmitting/receiving section 64 the data to be transmitted by the control section 60. When the transmitting of the data packet is prepared, a RTS (request to set) packet is transmitted to the access point 1 from the transmitting/receiving section 64 of the station 4-1, as shown in step S30 of FIG. 14. The access point 1 waits for a time duration td1 from the reception of the RTS packet to transmit CTS (clear to sent) packet to the station 4-1, as shown in step S31. The packet of data stored in the transmitting/receiving section 64 is transmitted as an electricmagnetic wave from the antenna 65, as shown in step S32, after the station 4-1 receives CTS packet, as shown in step S32.

At the access point 1, the adaptive array antenna 2 receives the electric-magnetic wave transmitted from the station 4-1, and a reception signal is inputted to the beam selecting section 52 via the beam forming circuits 51-1 to 51-M. At the beam selecting section 52, one of the reception signals from the beam forming circuits 51-1 to 51-M is selected. The selected reception signal is inputted to the control section 55.

The packet length-determining section 53 determines a packet length of the reception signal inputted to the control section 55. Based on this judgment, the station 4-1 sends, to the control packet generating section 54, information on the packet length of a control packet to be next transmitted. The control packet-generating section 54 generates a control packet of a packet length provided by the packet length-determining section 53, and sends the packet to the control section 55.

When the control section 55 of the access point 1 has successfully received a signal transmitted from the station 4-1, if a reception signal packet is a transmission request (RTS: Request To Send) packet, a transmission clear (CTS: Clear To Send) packet is sent to the transmitting/receiving section 64 of the station 4-1 via the antenna beams formed by the array antenna 2 and the beam forming circuit, which receives the RTS packet or the ACK packet, as shown in step S31 of FIG. 14. Alternatively, if the reception signal packet is a data packet, an ACK packet is also sent to the transmitting/receiving section 64 of the station 4-1 via the antenna beams formed by the array antenna 2 and the beam forming circuit, which receives the RTS packet or the ACK packet, as shown in step S33 of FIG. 14. The control section 55 transmits a CTS packet or ACK packet via an antenna pattern for use in reception. When the control section 55 forms an antenna beam other than the antenna beam for use in reception, the control section 55 transmits a control packet which is generated in the control packet-generating section 54.

Figure 13:
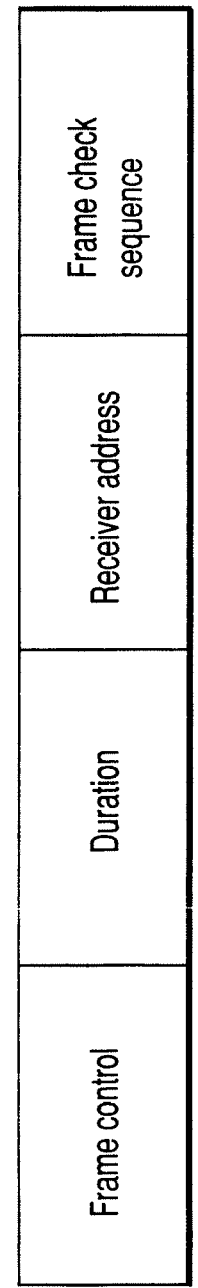
FIG. 13 is a schematic view showing a structure of a control packet to be transferred between the wireless communication station and the access point in the wireless LAN system shown in FIG. 12.

Of the packets thus transmitted from the access point 1, the CTS packet or ACK packet is received at the station 4-1, and the control packet shown in FIG. 13 is received at other stations 4-2 to 4-N.

The other station 4-2 to 4-N receives the control packet from the access point 1, as shown in step 34 of FIG. 14, when the CTS packet is set to the station 4-1 from the access point, as shown in step 34 of FIG. 14. If the other station 4-2 is prepared to transmit data packet to be sent to the access point 1, transmission timing is determined after an elapse of a time duration td2, based on the control packet and the data packet. Thus, the data packet is transmitted, at the transmission timing, from the station 4-2 to 4-N to the access point 1, as shown in step S35 of FIG. 14.

When the access point 1 can successfully receives the data packets from the stations 4-1 to 4-2, the access point 1 waits for a time duration td1 to sent ACK packet to the station 4-1, 4-2, as shown in steps 33, S36 of FIG. 14. Thus, the successive operational procedures are finished.

Now, procedures for transmitting/receiving a packet between the access point 1 and the wireless stations 4-1 to 4-N shown in FIG. 12 will be described in detail with reference to FIGS. 15A, 15B, 16A, 16B, 16C and 17.

The access point 1, for example, as shown in FIG. 15A, is located between the stations 4-1 and 4-2 and receives a signal transmitted from the station 4-1 in an up-link. As shown in FIG. 15B, in a down-link, an antenna beam 81 is formed in the direction of the station 4-1, and an antenna beam 82 is formed in the direction including that of the other station 4-2. The beam forming circuits 51-1 to 51-M form these antenna beams 81 and 82.

Figure 17:
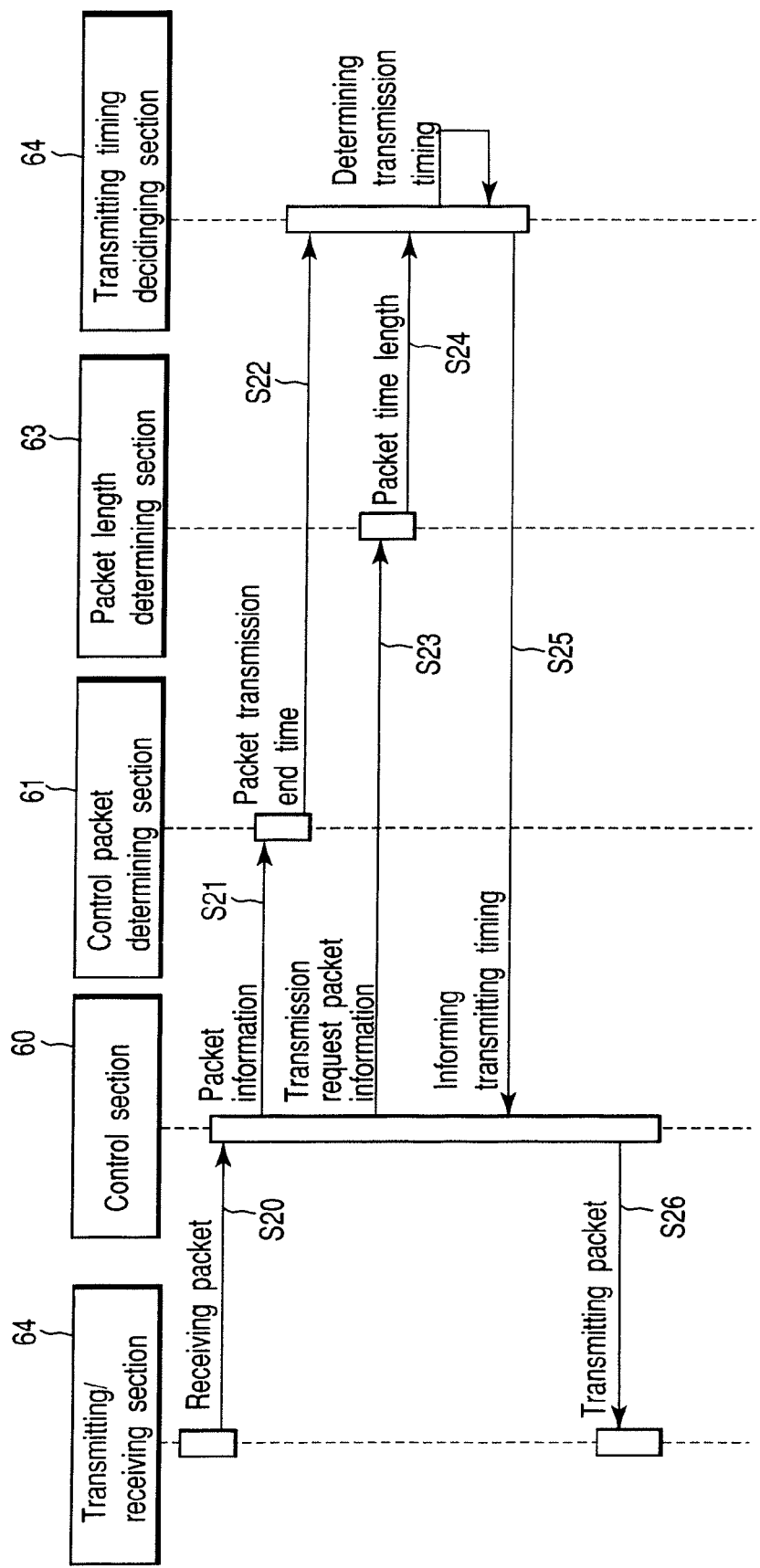
FIG. 17 is a schematic view showing operation of receiving and transmitting procedures in the system shown in FIG. 15.

FIG. 16A to FIG. 16C are a timing chart showing a transmitting/receiving operation of the station 4-1, access point 1, and station 4-2, and FIG. 17 shows operational procedures in the station 4-1. As shown in FIG. 16A to FIG. 16C, before the station 4-1 transmits a data packet, a RTS (Request To Send) packet 91 is transmitted from the station 4-1 to the access point 1, the access point 1 having received the RTS packet 91 transmits a CTS (Clear To Send) packet 92 to the station 4-1, and the station 4-1 having received the CTS packet 92 transmits a data packet 93. Information on a transmission reservation time is contained in the RTS packet 91. In accordance with this RTS packet 91, the access point 1 can know a maximum end time of ending transfer of a data packet from the station 4-1.

In addition, the access point 1 transmits the CTS packet 91 and ACK packet 96 generated by the control section 55 to the station 4-1 by using an antenna beam 81 of FIG. 15B oriented to the direction of the station 4-1. Further, the access point 1 transmits a control packet 94, as shown in FIG. 13, which is generated by the control packet generating section 54, to the station 4-2 by using an antenna beam 82 that covers the direction of the station 4-2. Information on a transmission end time "te1" or the time duration, which is obtained from the transmission reservation time contained in the RTS packet 91 transmitted from the station 4-1 is contained in this control packet 94.

Where another station 4-2 has a data packet to be transmitted to the access point 1, the station 4-2 decides a transmission timing of that data packet based on analysis of the control packet 94 transmitted from the access point 1. That is, the control packet 94 is inputted to a control packet-determining section 61. From this control packet-determining section 61, the predetermined transmission end time "te1" is outputted as the judgment result to a transmission timing deciding section 62. The transmission timing deciding section 62 decides a transmission timing of the data packet 95 to be transmitted next so that the predetermined transmission end time "te2" is identical to the predetermined transmission end time "te1" of the data packet 93 transmitted from the station 4-1. Alternatively, the access point 1 transmits the data packet 95 at transmission timing free of being overlapped with a transmission time of the ACK packet 96 relevant to the data packet 93 from the station 4-1 while the data packet 95 is received from the station 4-2.

Figure 18:
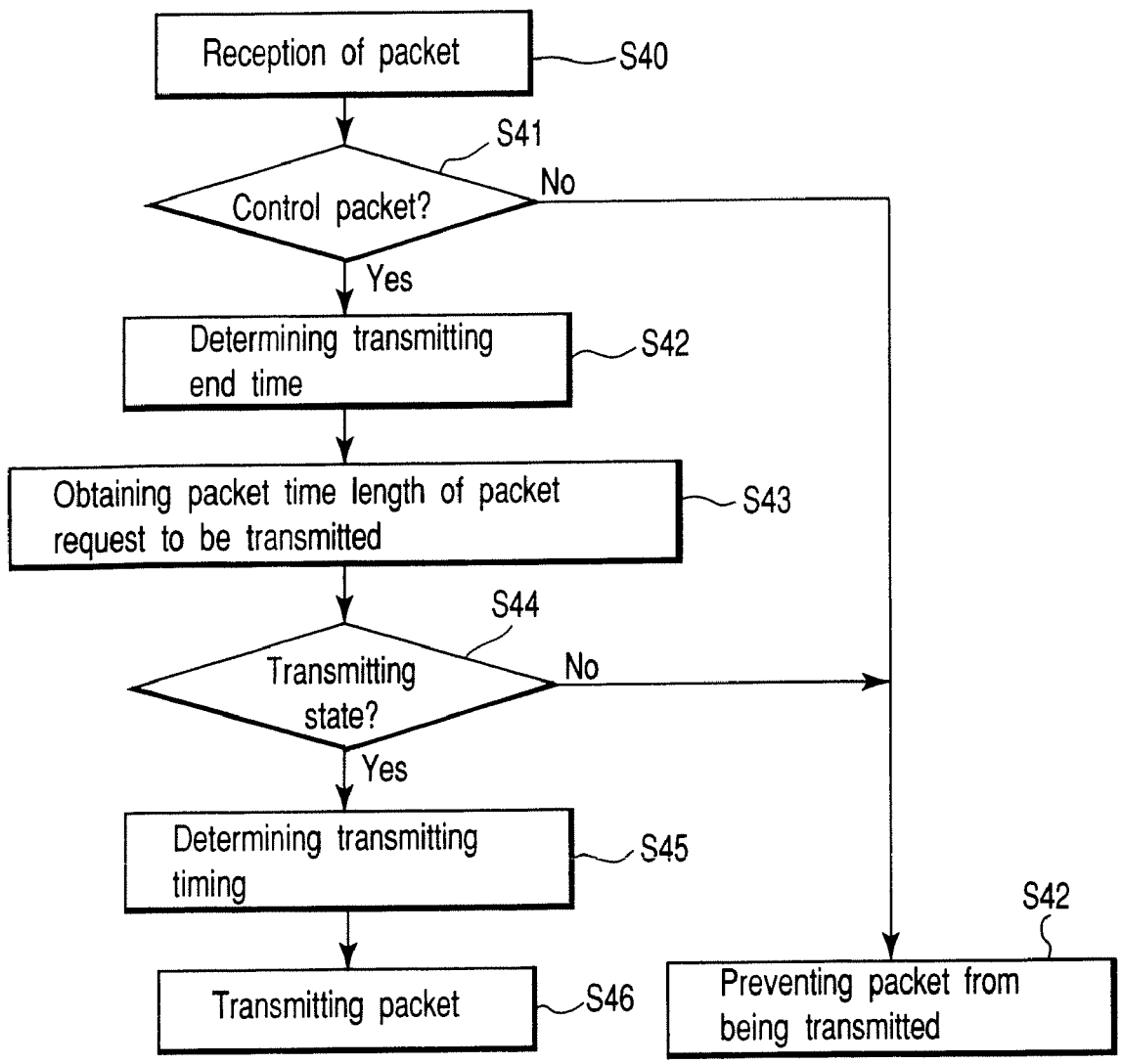
FIG. 18 is a flow chart showing operation of receiving and transmitting procedures in wireless LAN system shown in FIG. 12.

In the other station 4-2, when the transmitting/receiving section 64 receives a packet as shown step 20 of FIG. 18, the packet is supplied to the control section 60 as shown in step 20 of FIG. 17 and the control packet determining section 61 determines whether or not the packet is a control packet. If the received packet is not the control packet, no data packet is transmitted from the station to the access point 1 (steps S41 and S42 of FIG. 18). If the received packet is control packet, packet information in the control packet is supplied to the control packet determining section 61 as shown in step S21 of FIG. 17. In the control packet-determining section 61, a transmission end time is determined in accordance with the time duration in the control packet, as shown in step S43 of FIG. 18. The determined transmission end time is supplied to the transmission timing determining section 62, as shown in step S20 of FIG. 17. The information concerning a data packet to be transmitted is supplied to the packet length determining section 63 from the control section 60, as shown in step S23 of FIG. 17. In the packet length-determining section 63, a time period for transmitting the data packet is calculated, as shown in S43 of FIG. 18. The calculated time duration is supplied to the transmission timing determining section 64 as shown S24 of FIG. 17. In the transmission timing determining section 64, it is determined whether or not the data packet has the packet length which can finish the transmission of the data packet at the timing of the transmission end time, as shown in step 44 of FIG. 18. If the data packet cannot be transmitted before the transmission end time, the transmission of the data packet is inhibited, as shown in step S42 of FIG. 18. If the data packet can be transmitted before the transmission end time, the transmitting timing determining section 64 so determines a star timing of transmitting the data packet as to end the transmission of the data packet at the transmission end time, as shown in step of FIG. 18. The star timing is supplied to the control section 60 as shown in step S25 of FIG. 17 and the control section 60 causes the transmitting/receiving section 64 to start the transmission of the data packet at the start timing. Thus, the data packet is transmitted from the station 4-2 to the access point section 1, as shown in step S46 of FIG. 18.

In this way, the access point 1 does not receive the data packet 95 from the station 4-2 during transmission of the ACK packet 96, thus enabling SDMA. Where the access point uses a CSMA method, it is difficult for the access point to carry out transmission and receiving at the same time, since a transmission signal interferes with a reception signal. However, in the present embodiment, there is an advantage that the access point 1 can carry out SDMA without carrying out transmission and receiving at the same time.

A station having received a control packet does not transmit a data packet if a transmission request exists. At this time, the access point 1 can transmit an ACK packet 97 at a timing of transmitting the ACK packet 96, as shown in FIG. 16B.

A circuit configuration of the station 4-i (i=1, 2, ... N) in a fourth embodiment of the present invention will be described with reference to FIG. 19.

Figure 19:
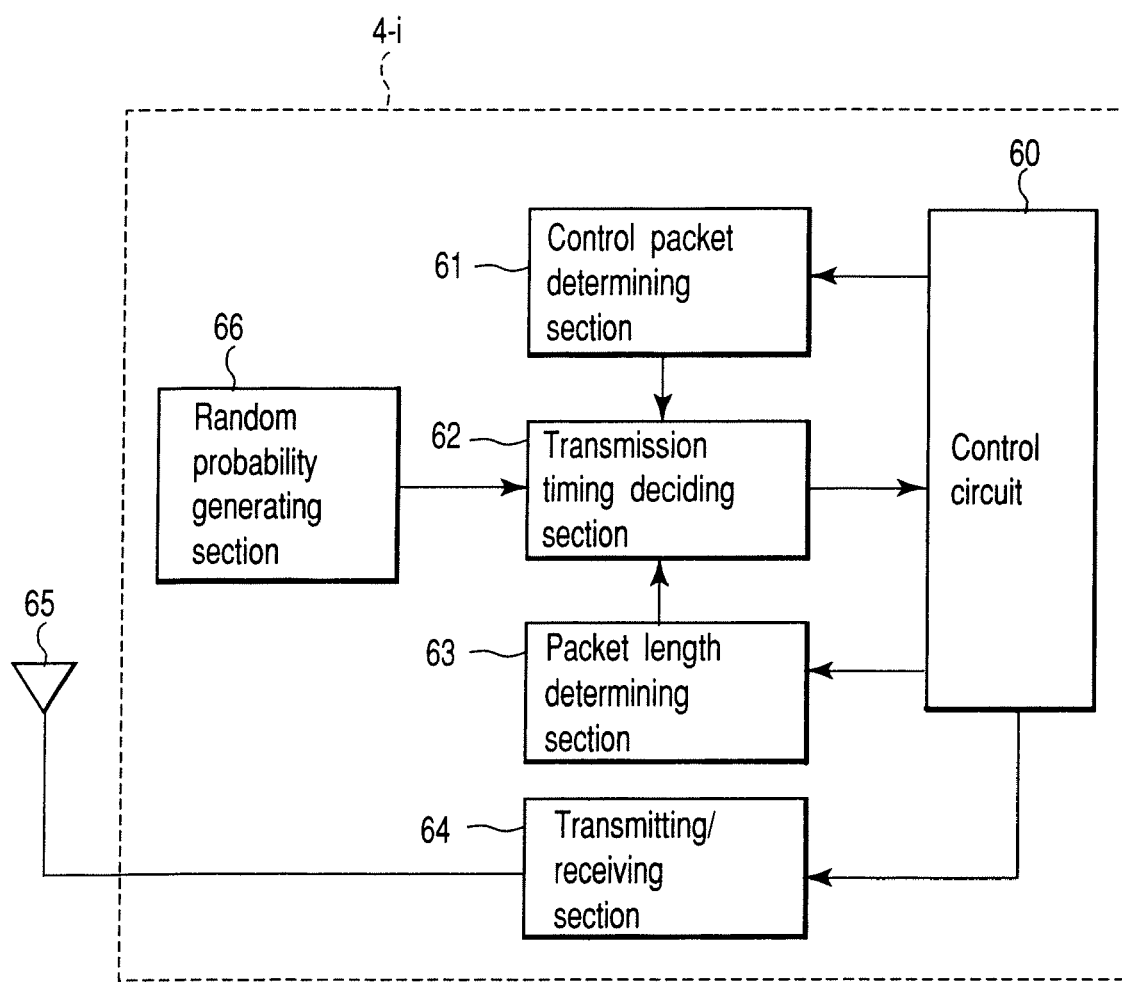
FIG. 19 is a block diagram showing a circuit configuration of a station according to another embodiment of the present invention.

As shown in FIG. 19, at the station 4-i, a random probability generating section 66 is added to the station 4-i shown in FIG. 11. As shown in FIG. 14, at the station 4-i, a control packet determining section 61 has a function for determining whether or not a control packet transmitted from the access point 1 has a broadcast address in which all the stations 4-i are a transmission destination. A random probability generating section 66 generates a random probability, for example, a random probability of a value between 0 and 1, and provides the probability to a transmission timing deciding section 62.

Now, an operation of a wireless communication system comprising a station shown in FIG. 19 will be described by focusing on a difference from a wireless communication system shown in FIG. 11.

At the station 4-i, a reception signal from an antenna 65 is inputted to a transmitting/receiving section 64. A packet of this receiving signal is inputted via a control section 60, or alternatively, directly to a control packet determining section 61. On the other hand, when the control section 60 delivers an RTS packet to the transmitting/receiving section 64, a packet length-determining section 63 determines a packet length of that RTS packet.

When it is determined by the control packet determining section that the control packet has a broadcast address at the control packet determining section 61, a packet transmission timing is decided in random at the transmission timing deciding section 62 in accordance with a random probability generated at the random probability generating section 66. A data packet is inputted from the control section 60 to the transmitting/receiving section 64 at this randomly decided transmission timing and transmitted by the antenna 65.

When there are a plurality of stations 4-i communicating with the access point 1 in an infrastructure mode, a plurality of stations 4-i receives a control packet transmitted from the access point 1. Therefore, when the access point 1 selects a destination address of one station from which a control packet is to be transmitted, from among the addresses of a plurality of stations 4-i, the station having received the control packet can transmit a data packet without collision with a data packet transmitted from another station.

Where a transmission request does not exist, the station having received the control packet transmitted from the access point 1 does not transmit a data packet. Thus, the access point 1 transmits a control packet with another station being a destination address. However, when a large number of stations 4-i exists and a small number of transmission requests of individual stations exists, processing becomes complicated in a method of thus changing the destination address of station, thereby transmitting the control packet.

In contrast, in the present embodiment, when a control packet is transmitted from the access point 1, such a control packets is transmitted to all the stations 4-i with the destination address being a broadcast. In this manner, while the access point 1 eliminates an inconvenience of changing the destination address of the control packet, a station having a transmission request can transmit a data packet immediately.

In this case, a plurality of stations 4-i have a transmission privilege, each packet is transmitted at timing in accordance with the random probability generated by the random probability generating section 66. In this manner, even if a plurality of stations 4-i are in a transmission request state, it is possible to reduce the probability of collision of packets transmitted by the stations each.

According to the wireless communication system according to the first to fourth embodiments described above, the access point can carry out proper transmitting/receiving between a plurality of stations while the SDMA method is applied to the CSMA method.

A wireless communication system according to the fifth to ninth embodiments of the present invention will be described with reference to FIG. 20 to FIG. 27.

Figure 20:
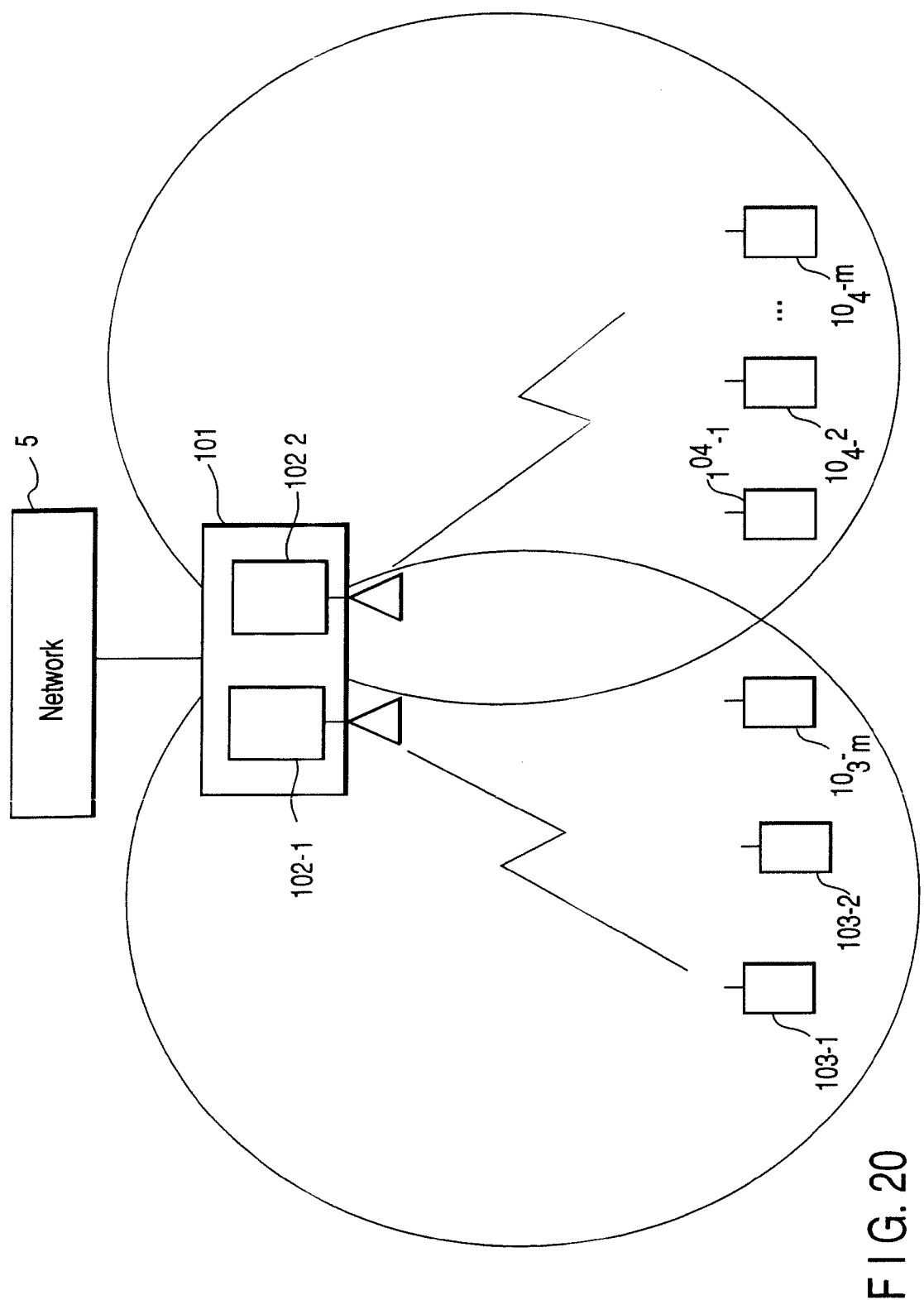
FIG. 20 is a view showing an entire configuration of a wireless communication system according to a still another embodiment of the present invention.

In the wireless communication system according to the fifth embodiment shown in FIG. 20, a CSMA/CA (Carrier Sense Multiple Access Collision Avoidance) protocol is applied.

As shown in FIG. 20, a wireless access point 101 connected to a wired network or the like comprises wireless module sections 102-1 and 102-2 for transmitting/receiving a radio signal. There are wireless stations 104-1 to 104-m for determining the possibility of one or a plurality of mutually autonomous transmissions using the same channel as the wireless module section 102-1 and determining the possibility of one or a plurality of mutually autonomous transmissions using the same channel as the wireless stations 103-1 to 103-n and wireless module section 102-2 under the SCM/CA method for avoiding collision of wireless packets, the wireless stations being controlled under the CSMA/CA (Carrier Sense Multiple Access Collision Avoidance) protocol for avoiding collision of wireless packets.

In the system shown in FIG. 20, the wireless module section 102-2 receives a signal transmitted from the wireless module section 102-1, even if a different channel exists. In addition, the section 102-1 receives a signal transmitted from the section 102-2 as well.

A description will be given with respect to a wireless communication system according to the fifth embodiment of the present invention for avoiding a packet error caused by interference of bypassing of a transmission signal between wireless communication modules targeted for such a wireless communication system.

FIG. 21 is a block diagram showing a wireless access point 101 according to the fifth embodiment of the present invention. In FIG. 21, the wireless module 102-1 has a transmitting/receiving antenna 201, a transmitting/receiving section 202, a reception information notifying section 203, and a wireless module control section 204. The wireless module 102-2 has a transmitting/receiving antenna 205, a transmitting/receiving section 206, a reception information acquiring section 207, and a wireless module control section 208.

At the wireless access point 101 shown in FIG. 21, a radio signal received by the transmitting/receiving antenna 201 is modulated by the transmitting/receiving section 202, and the modulated signal is inputted as data to the wireless module control section 204. The wireless module control section 204 transmits, to the reception information notifying section 203, information on a reception period of data being received or a data reception end time. The reception information-notifying section 203 transmits the information to the reception signal acquiring section 207 of the wireless module 102-2. The reception signal acquiring section 207 notifies the wireless module control section 208 that the wireless module 102-1 is being received. The wireless module control section 208 controls the transmitting/receiving section 206 so that the transmitting/receiving antenna 205 of the wireless module 102-2 does not output a radio signal.

Thus, if the wireless module section 102-2 use a different channel as that of the wireless module section 102-1 or have a directivity antennas which use a same channel as that of the wireless module 102-1, the wireless module sections 102-2 is so controlled as to transmit no radio signal, in a state that the wireless module section 102-2 communicates with the corresponding station 104-1 to 104-m via the channel. Therefore, in the radio signal being received by the wireless module 102-1, it is possible to reduce an error of the reception of the radio signal, since a transmission signal of the wireless module 102-1 is not outputted as an interference signal.

Even where the wireless module 102-1 and wireless module 102-2 use the adjacent frequency bandwidth, a mutually transmitting signal has a different frequency. A radio signal outputted by the wireless module 102-1 is received without being restricted by a filter. The wireless module transmits a signal with a large amount of power. Thus, if the module is installed at the same casing or in its neighboring place, even if the mutual wireless communication modules have the different frequency, interference occurs.

Thus, it is required that the wireless module section operates in corporation with the mutual transmitting/receiving timing.

An operation of wireless communication modules 102-1 and 102-2 in the wireless communication system according to the sixth embodiment of the present invention will be described with reference to FIG. 22.

In FIG. 22, the wireless module section 102-1 transmits ACK packets 301-0 to 301-2 and receives data packets 302-0 to 302-3. The wireless module section 102-2 transmits a synchronizing packet 303-0 and ACK packets 304-0 and 304-1 and receives data packets 305-0 and 305-1.

When a wireless module 102-1 receives the data packet 302-0, it transmits to the wireless module 102-2 the fact that the data packet is being received. In addition, the packet time length and packet reception end time of the simultaneously received data packet 302-0 as well are notified to the element 102-2. That is, in response to the reception of the data packet, the control section 204 informs to the reception information-acquiring section 207 via the reception information-notifying section 203, the reception of the data packet at the wireless module 102-1, a packet time length of the data packet 302-0, and a packet reception time. The wireless module 102-1 transmits ACK packet 301-0 to the station 103-1 to 103-3, when the wireless module 102-1 have received the data packet. The wireless module 102-2 transmits a synchronizing packet at the same time length as the ACK packet 301-0 in synchronized with the transmission timing of the ACK packet 301-0.

The wireless module predicts the transmission timing of the ACK packet from the packet time length and the packet reception end time of the data packet 302-0, which is acquired by the reception information acquiring section 207, and the control section 208 causes the transmitting/receiving section 206 to transmit the synchronizing packet to the station 104-1 to 104-m at the transmission timing. The transmission end time information is contained in the synchronizing packet, and the wireless station using the same channel as the wireless module 102-2 can know a time at which transmission is to be terminated in the wireless station 104-1 to 104-m. The wireless station 104-1 to 104-m receives the synchronizing packet 303-0. Where a data packet to be transmitted exists, the wireless station 104-1 to 104-m decides the time length and transmission time of the data packet and so transmits the data packet as to terminates at the transmission end time notified by the synchronizing packet 303-0.

Where fragmented data packets are consecutively received at the wireless module 102-1, the wireless station 104-1 to 104-m using the same channel as the wireless module 102-2 as well divides a data into segment data which is packed in the data packet with the packet time length notified by the synchronizing packet 303-0 to transmit the data packet to the wireless module 102-2. Therefore, transmission and reception are carried out by the wireless module 102-1 and wireless module 102-2 at the same time. In this embodiment according to the present invention, the data packets 301-0 to 301-2 and 302-0 to 302-2 have a same packet time length and are transmitted during the same period. In this embodiment, the data packets 301-0 to 301-2 and 302-0 to 302-2 may have time information relating to the transmission time duration therein, as shown in FIGS. 5 and 6, and the packet time length and the packet reception end time may be obtained from the time information of the transmission time duration.

As has been described above, in a wireless LAN under the CSMA/CA method that is a distribution control, wireless communication modules providing interference each other can be used, making it possible to efficiently utilize a radio frequency. This makes it possible to provide the above channel using the wireless module as an adjacent channel.

In addition, even where the frequency channels used by the wireless communication modules are identical to each other and each wireless module uses an antenna having its different directivity, or alternatively, uses an adaptive array or smart antenna capable of freely changing directivity, a synchronizing packet is effective, making it possible to avoid a packet transmission error due to antenna bypassing.

An operation of wireless module sections 102-1 and 102-2 in the wireless communication system according to the sixth embodiment of the present invention will be described with reference to FIG. 23.

The wireless module 102-1 transmits a synchronizing packet 401-0, and receives a data packet 402-0 transmitted from a wireless station 103-1 to 103-m using the same channel as the module 102-1. The wireless module 102-1 transmits an ACK packet 401-1 in response to a reception of the data packet 402-0. The wireless module 102-2 also transmits the synchronizing packet 403-0, and receives a data packet 404-0 from the wireless station using the same channel as the module 102-2. The wireless module 102-2 also transmits an ACK packet 403-1 in response to a reception of the data packet 404-0.

The wireless module 102-1 and wireless module 102-2 transmit synchronizing packets, respectively when no data packet is received. The wireless stations 103-1 to 103-m having received the synchronizing packet transmits a data packet so as to terminate transmission at a transmission end time which is decided in accordance with time information in the synchronizing packet.

Therefore, in the radio communication system, the wireless communication modules 102-1 and 102-2 make it possible to transmit the ACK packets 401-1 and 403-1 at the same time.

The synchronizing packets 401-0 to 403-0 makes it possible to periodically decide a transmission end time of a wireless station in accordance with a single synchronizing packet even if these packets are not always periodically transmitted.

The synchronizing packet has a same data structure as that of the control packet shown in FIG. 13 and has time information relating to a timing or duration for ending the reception of the data packet. That is, a synchronizing packet is provided to decide the reception end time of a data packet transmitted by a wireless station. Any information containing the above effect may be provided. For example, instead of the transmission end time, the time length of the data packet may be predetermined based on information on only the transmission start time.

The wireless stations 103-1 to 103-m using the same channel as the wireless module 102-2 makes it possible to transmit a packet when the wireless module 102-2 does not transmit an ACK packet if the wireless module 102-1 terminates transmission during a packet-receiving period.

The wireless communication system according to the eighth embodiment of the present invention will be described again with reference to FIG. 24 and FIG. 25.

A wireless module section 102-1 in a wireless access point has a transmitting/receiving antenna 201, a transmitting/receiving section 202, a wireless module control section 203, and a transmission information notifying section 204, as shown in FIG. 21. A wireless module section 102-2 has a transmitting/receiving antenna 205, a transmitting/receiving section 206, a transmission information acquiring section 207, and a wireless module control section 208.

Now, a signal flow will be described here with reference to FIGS. 24 and 25. When a data transmission request occurs with the wireless module 102-1, the wireless module control section 203 modulates data into a radio signal via the transmitting/receiving section 202, and transmits the radio signal by using the transmitting/receiving antenna 201. In addition, the wireless module control section 203 uses the transmission information-notifying section 204, and notifies the transmission information acquiring section 207 of the wireless module 102-2 of the fact that the transmitting/receiving module 202 transmits the radio signal. The wireless module control section 208 determines that the wireless module 102-1 is transmitting a packet from the transmission information-acquiring section 207. The wireless module control section 208 is changed to a state capable of outputting data to the transmitting/receiving section 206 in response to a signal from the transmission information-acquiring section 207. The transmitting/receiving section 206 transmits a radio signal by using the transmitting/receiving antenna 205.

Figure 24:
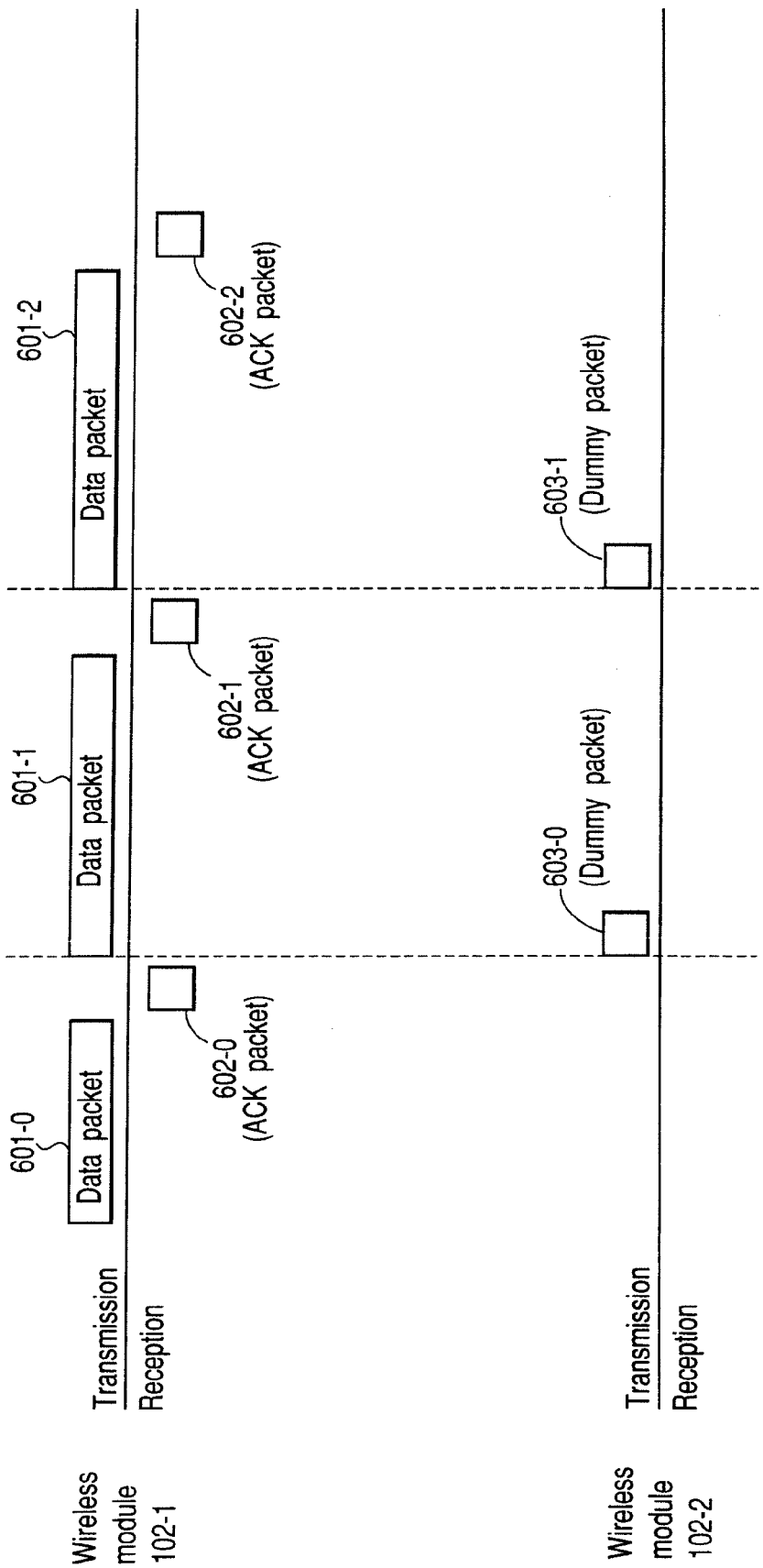
FIG. 24 is a schematic view showing still another operation of receiving and transmitting procedures in the wireless module shown in FIG. 21.

As shown in FIG. 24, the wireless module 102-1 transmits data packets 601-0 to 601-2, and receives ACK packets 602-0 to 602-2 corresponding to the data packet. In contrast, the wireless module 102-2 transmits packets 603-0 and 603-1 so as not to receive the packet of the wireless station.

While the wireless module 102-1 is in transmission, when a dummy packet is transmitted by the wireless module 102-2, the wireless station using the same channel as the wireless module 102-2 carries out carrier sensing, and does not transmit a packet. When the wireless module 102-1 is in transmission, the wireless module 102-2 disables reception. Thus, the wireless station using the same channel as the wireless module 102-2 makes it possible to reduce wasteful packet transmission.

At this time, the packets 603-0 and 603-1 may have the same time length as the packet transmitted by the wireless module 102-1, may be packets such that the wireless station physically carries out carrier sensing, or alternatively, may be packets such that information (NAV information) on virtual carrier sensing of the wireless station such as RTS packets is set.

Further, when the wireless station using the same channel as the wireless module 102-2 makes it possible to receive and determine a signal transmitted by the module 102-1, the wireless station using the same channel as the module 102-2 makes it possible to know that a packet is not received.

The wireless communication system according to the ninth embodiment of the present invention will be described again with reference to FIG. 25.

Figure 25:
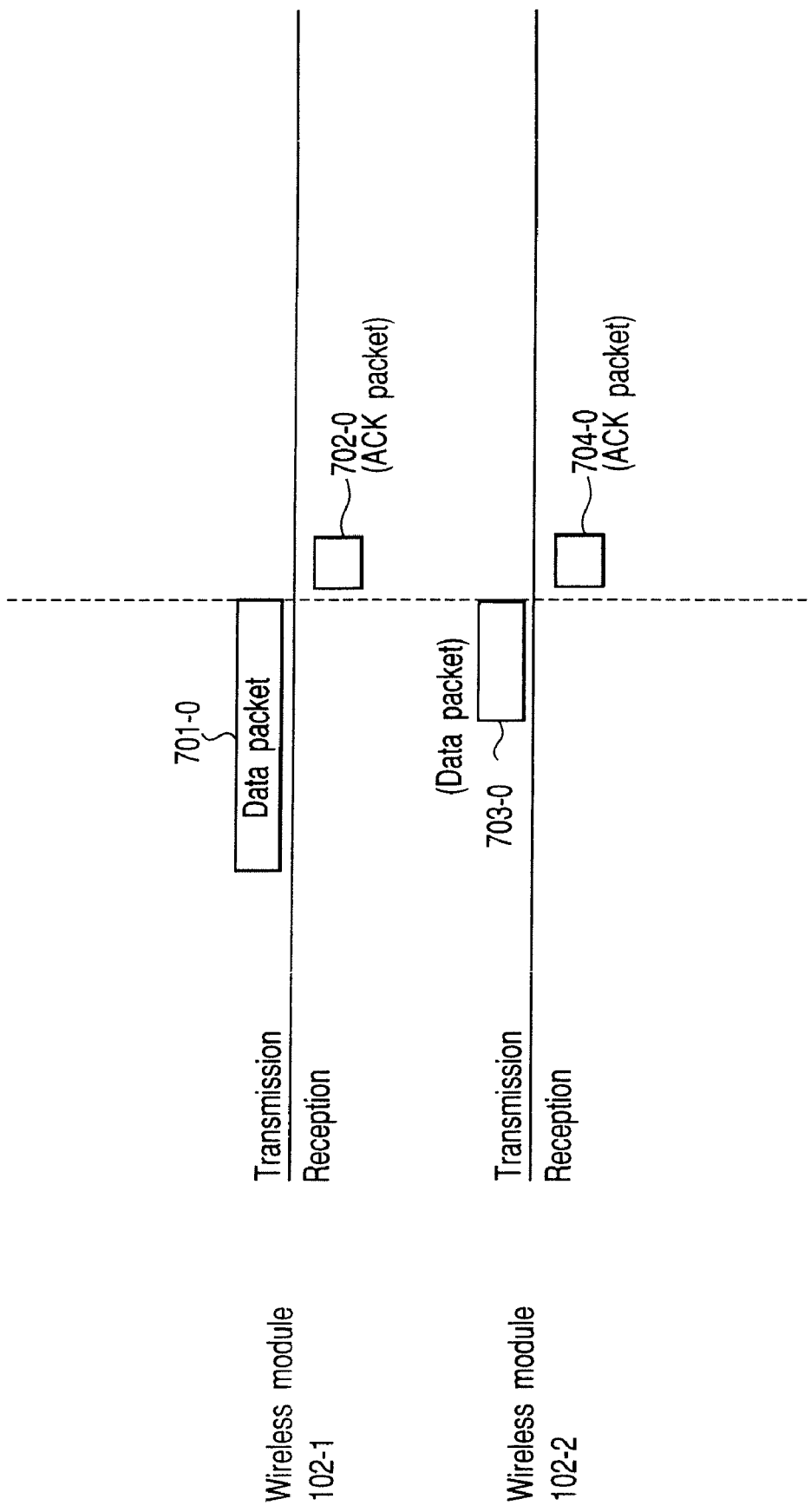
FIG. 25 is a schematic view showing yet another operation of receiving and transmitting procedures in the wireless module shown in FIG. 21.

As shown in FIG. 25, a wireless module 102-1 transmits a data packet 701-0. A wireless module 102-2 is so controlled by the controller as to determine that the wireless module 102-1 is in transmission, and so transmits a data packet 703-0 as to end the transmission at the same time as the transmission end time of the data packet 701-0. Thus, the wireless module 102-1 and wireless module 102-2 make it possible to receive the ACK packets 702-0 and 704-0 at the same timing.

At this time, at the transmission end time of the data packet 703-0 transmitted by the wireless module 102-2, while the wireless module 102-1 transmits the data packet 701-0, the wireless module 102-2 does not receive the ACK packet 704-0. Alternatively, while the wireless module 102-2 transmits a data packet 703-0, a deviation of time is permitted to an extent such that the wireless module 102-1 does not receive the wireless station packet.

Apart from deciding the data packet transmission end time, the wireless module 102-2 decides the data packet transmission start time and packet time length, thereby making it possible to achieve the above operation.

A modified example of the wireless communication system according to the ninth embodiment of the present invention will be described here.

The wireless module 102-1 and wireless module 102-2 may be so controlled by the control sections 204, 208 as to sense the carries at the same time, before deciding the data packet transmission start time. Thus, it possible to set the transmission start times of the wireless module 102-1 and wireless module 102-2 to be the same as each other. In this system, the wireless module 102-1 and wireless module 102-2 are identical to each other in time length of a packet to be transmitted, whereby the same transmission end times are transmitted.

Further, while the wireless module 102-1 is in a transmission period, the wireless module 102-2 makes it possible to transmit an ACK packet free data packet, or alternatively, a broadcast packet or multicast packet.

Carrying out cooperative operation such that the wireless module transmits above synchronizing packet is defined as a synchronous mode. Carrying out operation in autonomous distribution by respective wireless module sections is defined as an asynchronous mode. In the asynchronous mode, a packet error due to bypassing via a transmitting/receiving antenna of a transmission signal between wireless communication modules is permitted without transmission of a synchronizing packet or the like.

When a large amount of data is to be transmitted/received, the data being corrected to a time length of a wireless packet, the wireless module 102-1 and wireless module 102-2 decide the fact that above synchronous mode is established. In other cases, the asynchronous mode is established. At this time, at the wireless access point, processing is simplified because no control between the modules is carried out. In the synchronous mode, a packet can be transmitted/received effectively. Alternatively, it is possible to decide that the above operation is carried out when the packet time length is small.

Figure 26:
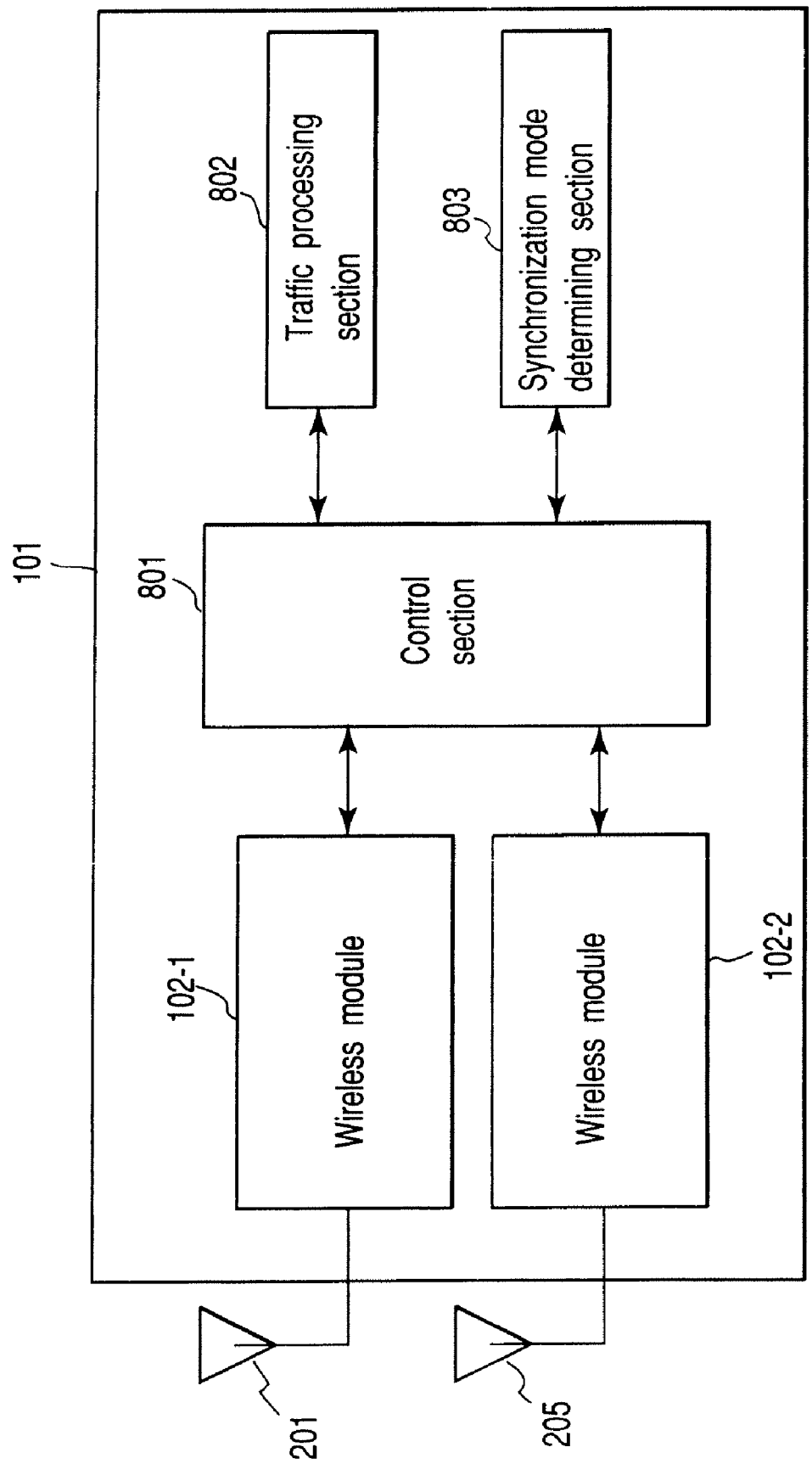
FIG. 26 is a block diagram showing a modified circuit configuration of a wireless access point shown in FIG. 21.

In addition, in a wireless communication system as shown in FIG. 26, in which traffic statistics of each wireless module 102-1, 102-2 is stored in the traffic processing section 802, a synchronous mode determining section can decide the synchronous or a synchronous mode depending on the traffic state. In the access point 101, the wireless communication modules 102-1, 102-2 are controlled by control section 801, and the control section 801 monitors the traffics of the data transmission and reception between the access points and the stations. The monitored traffics are supplied to the traffic processing section 802 and processed as traffic statistic data, which is stored in the traffic statistic processing section. The traffic statistic data is sent to the synchronous mode determining section 803 as a traffic state so that the one of synchronous and asynchronous modes is determined in accordance with the traffic state in the determining section 803. For example, when small traffics are frequently produced, in which relatively small data items are transferred between the access point 101 and stations, the determining section 803 determines the synchronous mode and sets the wireless communication modules 102-1, 102-2 in the synchronous modes. Thus, transmission/reception of a wireless packet is carried out in a cooperative manner in accordance with the synchronous mode, thereby making it possible to ensure efficient packet transmission. In addition, when large traffics are frequently produced, in which relatively large data items are transferred between the access point 101 and stations, the determining section 803 may also determine the synchronous mode and sets the wireless communication modules 102-1, 102-2 in the synchronous modes.

Figure 27:
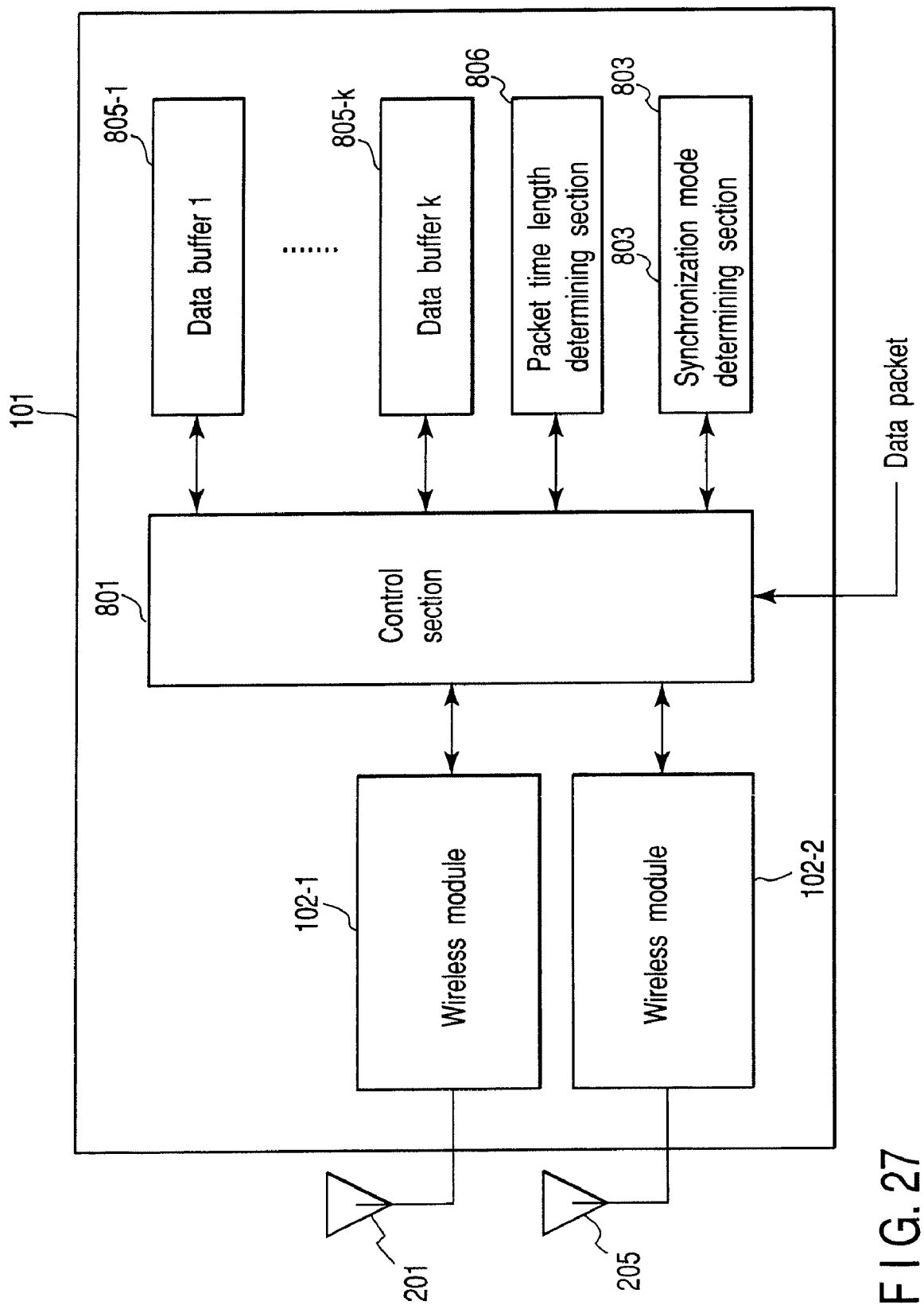
FIG. 27 is a block diagram showing another is a block diagram showing a circuit configuration of a wireless access point shown in FIG. 21.

A wireless module has a plurality of different buffers 805-1 to 805-$k$, as shown in FIG. 27, and the different buffers 805-1 to 805-$k$ are used depending on the packet time length. In this system, one of the synchronous mode or asynchronous mode can be selected depending on the packet time length.

Generally, a data packet to be transmitted by the wireless module 101 is stored in a buffer 805-1. If the wireless module 101 has only one buffer 805-1, a plurality of the packets are stored in the buffer 805-1 for temporarily storing the packets under the control of the control section 801. Thus, it is difficult to sample an arbitrary packet from the buffer 805-1. However, if the wireless module 101 is provided with a plurality of buffers 805-1 to 805$l$ having different buffer size, the data packet can be stored in one of the buffers 805-1 to 805$l$ depending on its size. Thus, if the predetermined data size of the data packet to be transmitted is determined, one of the buffers 805-1 to 805$l$ is selected depending on the predetermined data size so that the data packet having the predetermined data size can be selected.

In the wireless communication system, the data packet to be transmitted is input in the control section 401, the packet time length of the data packet is determined in the packet time length determining section 806. Thus, the control section 401 supplies the data packet to one of the data buffers 805-1 to 805-$k$, which has a buffer size corresponding to the packet time length of the data packet. Accordingly, data packets having different packet time lengths are stored in the data buffers 805-1 to 805-$k$. When the wireless module 101-1 transmits one of the data packets, the control section 801 selects one of the data buffers 805-1 to 805-$k$, in which the one of the data packets to be transmitted is stored. The control section 801 determines whether or not the packet time length of the one of the data packets is larger than predetermined reference time length. The control section 801 determines one of synchronous and asynchronous modes depending on the determination of the packet time length. That is, if the packet time length of the one of the data packets is not larger than predetermined reference time length, the control section 801 sets the wireless module sections 102-1, 102-2 in the asynchronous mode, In the above-described embodiment, the wireless station in a dependent relation with the wireless access point decides in random whether or not packet transmission is enabled/disabled even if a synchronizing packet is received. This makes it possible to avoid packet collision in which wireless stations receive a synchronous packet and transmits a data packet at the same time.

In addition, it is possible for the wireless station to decide random probability of packet transmission based on the priority (QoS) of traffics, carrier sensing, and packets.

Where a plurality of wireless stations have received synchronous packet, and such plurality of wireless stations have their respective transmission requests, packet collision occurs. Even if the wireless station has received the synchronous packet, packet collision can be avoided by deciding whether or not such packet is to be transmitted at a random probability. The wireless station can acquire traffic information on the wireless station or wireless access point using the same channel, decide a packet transmission probability, and carry out efficient packet transmission.

The packet transmission probability can be decided from the packet priority (QoS) to be decided depending on the upper layer.

In addition, if the destination address of the synchronous packet specifies its own wireless station so as to carry out the specified wireless station packet transmission, no packet collision occurs, thus increasing efficiency. Because of this, the destination address of the synchronous packet may indicate all the wireless stations or may specify wireless stations in plurality or their own.

A channel to be used by a wireless module may be a periodically adjacent channel. In addition, as a transmitting/receiving antenna possessed by the wireless module, there is used an antenna having its directivity. Periodically, the same channel may be used. As a transmitting/receiving antenna, there can be provided an antenna with its variable directivity such as adaptive array. There is a case in which wireless module shares one array antenna, an antenna beam pattern is provided as multiple beams, thereby transmitting/receiving a radio signal to each wireless module. Because of this, the channels as claimed in claims may be channels different from each other in frequency or may be such channels as to accommodate a specific wireless station decided depending on the frequency and antenna beam pattern.

Apart from each wireless module, a control section is provided in a wireless access point, thereby making it possible to achieve synchronous mode operation. At this time, operation of wireless communication modules M1 and M2 is decided depending on the control section in the wireless access point irrespective of the wireless communication modules M1 and M2.

Figure 28:
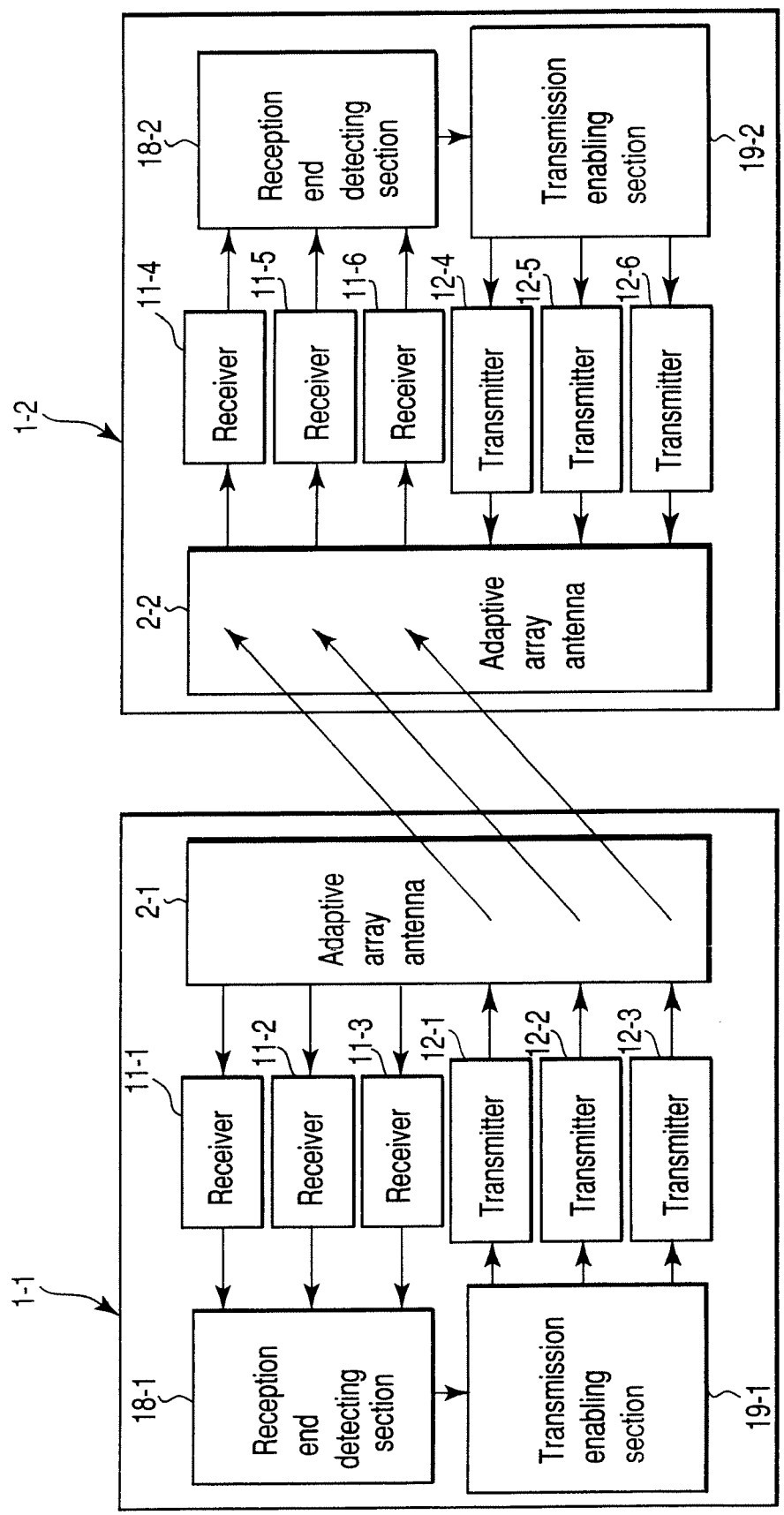
FIG. 28 is a block diagram showing a circuit configuration of a wireless communication system according to yet another embodiment of the invention.

The system according to an aspect of the invention is not limited to the wireless communication system of the access point and the stations, as shown in FIGS. 1 and 20. It is apparent that this invention can be applied to a system in which wireless communication stations 1-1, 1-2 are provided with adaptive array antennas 2-1, 2-2, respectively, as shown in FIG. 28. The wireless communication stations 1-1, 1-2, shown in FIG. 28, comprises receivers 11-1 to 11-3 and 11-4 to 11-6, transmitters 12-1 to 12-3 and 12-4 to 12-6, reception end timing detecting sections 18-1, 18-2, and transmitting enabling sections 19-1, 19-2, in a same manner as that of the wireless communication system.

Figure 29:
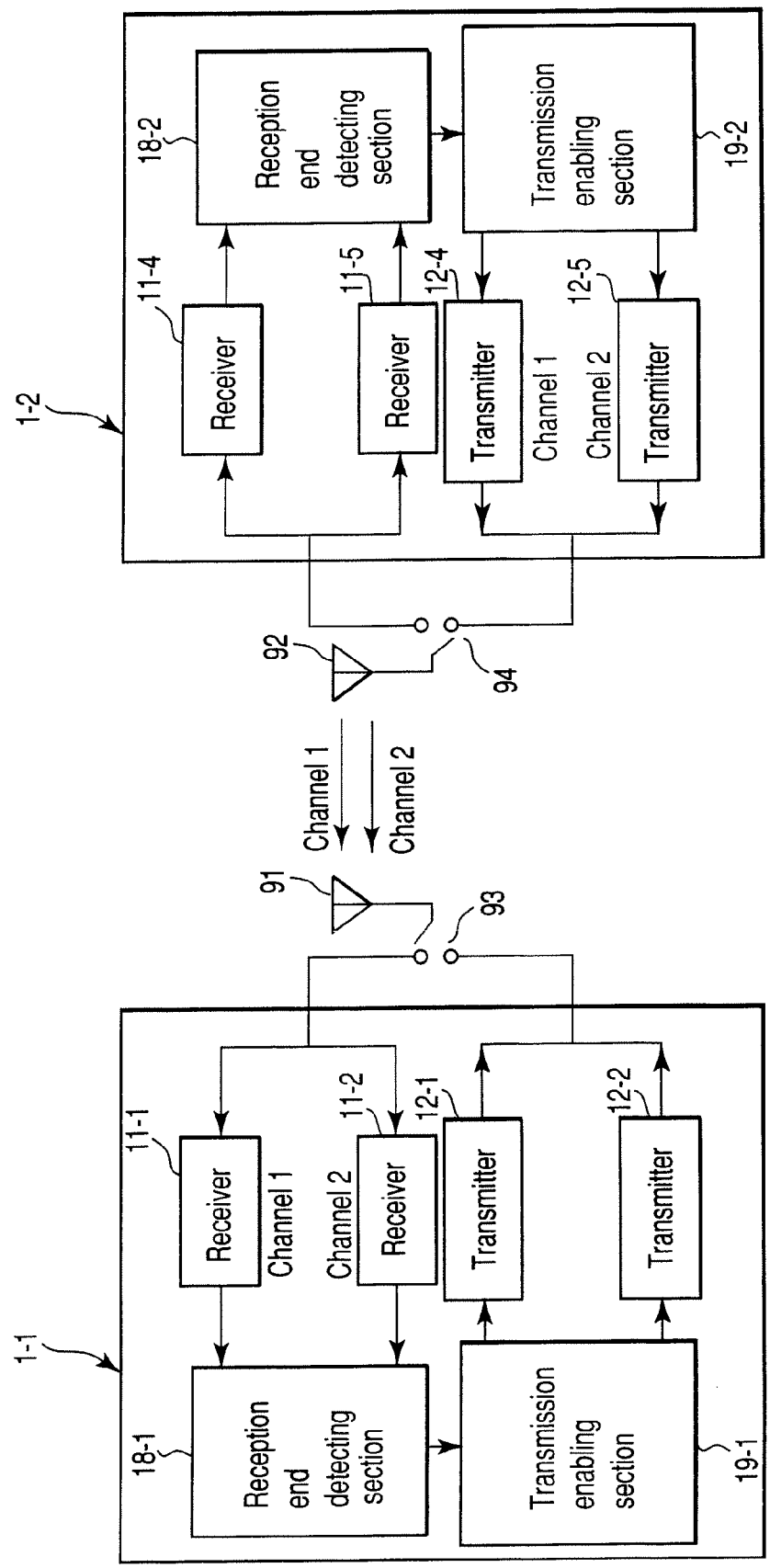
FIG. 29 is a block diagram showing a circuit configuration of a wireless communication system according to yet further embodiment of the invention.

As shown in FIG. 29, it is possible to apply this invention to a communication system, which is provided with wireless communication stations 1-1, 1-2. The with wireless communication stations 1-1, 1-2 is provided with antennas 91, 92, instead of the adaptive antenna array 2-1, 2-2, for receiving and transmitting adjacent channels 1 and 2 as carriers, and switching units 93, 94 for switching between transmitters 11-1, 11-2, 11-3, 11-4 and receivers 12-1, 12-2, 12-3, 12-4.

The wireless communication system, shown in FIG. 29, has a same function and is operated in a same manner as that of the above described embodiments, except for provision of the switching unit 93, 94 which connect the antennas 93, 94 to the transmitters 11-1, 11-2, 11-3, 11-4, in the transmission mode, respectively, and connect the antennas 93, 94 to the receivers 12-1, 12-2, 12-3, 12-4, in the reception mode, respectively.

As has been described, According to an aspect of the present invention, there is provided a wireless communication station capable of properly carrying out transmission/reception between the wireless communication station and another wireless communication station.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus for receiving first and second reception signals from at least one of wireless communication units and transmitting first and second transmission signals to at least one of the wireless communication units, comprising:
   a receiving portion including first and second receiver modules configured to receive the first and second reception signals from at least one of the wireless communication units;
   a transmission portion including first and second transmitter modules configured to transmit the first and second transmission signals to at least one of the wireless communication units; and
   a control portion configured to control the transmission portion so as to transmit the first and second transmission signals from the first and second transmitter modules at a transmitting timing which is so determined to have an elapsed time period after the reception end of the first and second reception signals in the first and second receiver modules, the elapsed time period being determined in accordance with a random probability.

2. The wireless communication apparatus according to claim 1, wherein the first and second transmission signals have a same transmission period during which the transmission of the first and second transmission signals are completed.

3. The wireless communication apparatus according to claim 1, wherein the wireless communication units include first and second wireless communication units, and the first and second receiver modules receive the first and second reception signals from the first and second wireless communication units, respectively.

4. A wireless communication apparatus for receiving first and second reception signals from at least one of wireless communication units and transmitting first and second transmission signals to at least one of the wireless communication units, comprising:
   a receiving unit including first and second receiver modules to receive the first and second reception signals from at least one of the wireless communication units through first and second adjacent channels;
   a transmission unit including first and second transmitter modules configured to transmit the first and second transmission signals to at least one of the wireless communication units through one of the first and second adjacent channels or through the first and second adjacent channels; and
   a control unit configured to control the transmission unit so as to transmit the first and second transmission signals from the first and second transmitter modules at a transmitting timing which is so determined to have an elapsed time period after the reception end of the first and second reception signals in the first and second receiver modules, wherein the control unit determines the elapsed time period in accordance with a random probability.

5. The wireless communication apparatus according to claim 4, wherein the first and second transmission signals have a same transmission period during which the transmission of the first and second transmission signals are completed.

6. The wireless communication apparatus according to claim 4, wherein the wireless communication units include first and second wireless communication units, and the first and second receiver modules receive the first and second reception signals from the first and second wireless communication units, through the first and second adjacent channels, respectively.

7. A wireless communication apparatus according to claim 4, wherein the first and second transmitter modules set transmission start times to be the same as each other.

8. A wireless communication apparatus according to claim 4, wherein the first and second transmitter modules transmit the first and second transmission signals at the same time.

9. A wireless communication apparatus for receiving first and second reception signals from at least one of wireless communication units and transmitting first and second transmission signals to at least one of the wireless communication units, comprising:
   a receiving unit receiving the first and second reception signals from at least one of the wireless communication units through first and second adjacent channels;
   a transmission unit transmitting the first and second transmission signals to at least one of the wireless communication units through one of the first and second adjacent channels or through the first and second adjacent channels; and
   a control unit controlling the transmission unit so as to transmit the first and second transmission signals from the transmission unit at a transmitting timing which is so determined to have an elapsed time period after the reception end of the first and second reception signals, wherein the control unit determines the elapsed time period in accordance with a random probability.

10. A wireless communication apparatus according to claim 9, wherein the transmission unit sets the transmission start times to be the same as each other.

11. A wireless communication apparatus according to claim 9, wherein the transmission unit transmits the first and second transmission signals at the same time.

12. A wireless communication apparatus for receiving first and second reception signals from at least one of another wireless communication apparatus and transmitting first and second transmission signals to at least one of the another wireless communication apparatus, comprising:
   a first wireless unit configured to receive the first reception signal from at least one of the another wireless communication apparatus through a first channel and transmit the first transmission signal to at least one of the another wireless communication apparatus through the first channels;
   a second wireless unit configured to receive the second reception signal from at least one of the another wireless communication apparatus through a second channel adjacent to the first channel and transmit the second transmission signals to at least one of the another wireless communication apparatus through the second channel; and
   a control unit configured to control the second wireless units so as to transmit the first and second transmission signals from the second wireless unit at a transmitting timing which is so determined to have an elapsed time period after the reception end of the first and second reception signals, wherein the control unit determines the elapsed time period in accordance with a random probability.

13. A wireless communication apparatus according to claim 12, wherein the first and second wireless units sense carriers at the same time.

14. A wireless communication apparatus according to claim 12, wherein the first and second wireless units set the transmission start times to be the same as each other.

15. A wireless communication apparatus according to claim 12, wherein the first and second wireless units transmit the first and second transmission signals at the same time.

* * * * *